United States Patent
Park et al.

(10) Patent No.: US 9,827,523 B2
(45) Date of Patent: Nov. 28, 2017

(54) AIR CLEANER

(71) Applicant: LG ELECTRONICS INC., Seoul (KR)

(72) Inventors: Jaekyun Park, Seoul (KR); Hyunpil Ha, Seoul (KR); Soonki Jung, Seoul (KR); Yeongcheol Mun, Seoul (KR); Soohyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/363,204

(22) Filed: Nov. 29, 2016

(65) Prior Publication Data

US 2017/0246572 A1    Aug. 31, 2017

(30) Foreign Application Priority Data

Feb. 26, 2016  (KR) .................. 10-2016-0023663
Jun. 13, 2016  (KR) .................. 10-2016-0073063
Oct. 25, 2016  (KR) .................. 10-2016-0139376

(51) Int. Cl.
| | |
|---|---|
| *B01D 46/00* | (2006.01) |
| *B01D 46/42* | (2006.01) |
| *F24F 3/16* | (2006.01) |
| *F24F 1/02* | (2011.01) |

(52) U.S. Cl.
CPC ..... *B01D 46/0047* (2013.01); *B01D 46/0008* (2013.01); *B01D 46/0021* (2013.01); *B01D 46/4245* (2013.01); *F24F 1/02* (2013.01); *F24F 3/1603* (2013.01); *B01D 2267/60* (2013.01); *F24F 2003/1614* (2013.01)

(58) Field of Classification Search
CPC combination set(s) only.
See application file for complete search history.

(56) References Cited

U.S. PATENT DOCUMENTS

| | | | |
|---|---|---|---|
| 4,365,980 A | 12/1982 | Culbert et al. | |
| 5,117,652 A | * 6/1992 | Takeuchi | ................ F24F 1/025 62/291 |
| 5,264,015 A | 11/1993 | Matsui | |

(Continued)

FOREIGN PATENT DOCUMENTS

| | | |
|---|---|---|
| CN | 102661295 | 12/2014 |
| CN | 204141826 | 2/2015 |

(Continued)

OTHER PUBLICATIONS

United States Office Action dated Jan. 20, 2017 issued in U.S. Appl. No. 15/363,156.

(Continued)

*Primary Examiner* — Robert Clemente
(74) *Attorney, Agent, or Firm* — Ked & Associates LLP

(57) ABSTRACT

An air cleaner is provided that includes a first air cleaning module including a first fan that generates an air flow toward a first discharge outlet from a first suction inlet; a second air cleaning module including a second fan that generates an air flow toward a second discharge outlet from a second suction inlet; a divider provided between the first air cleaning module and the second air cleaning module, the divider including a dividing plate space; and a printed circuit board (PCB) device provided in the dividing plate space.

20 Claims, 18 Drawing Sheets

(56) References Cited

U.S. PATENT DOCUMENTS

| | | | |
|---|---|---|---|
| 5,334,248 | A | 8/1994 | Kwak |
| 5,641,343 | A | 6/1997 | Frey |
| 5,753,000 | A | 5/1998 | Chiu et al. |
| 6,494,940 | B1* | 12/2002 | Hak .................. A61L 9/16 55/471 |
| 8,212,146 | B1 | 7/2012 | Moore |
| 2006/0107834 | A1 | 5/2006 | Vandenbelt et al. |
| 2006/0201119 | A1 | 9/2006 | Song |
| 2006/0277875 | A1 | 12/2006 | Schuld |
| 2007/0137489 | A1 | 6/2007 | Luo |
| 2007/0221061 | A1* | 9/2007 | Steiner .................. B03C 3/32 96/63 |
| 2010/0225012 | A1* | 9/2010 | Fitton .................. F24F 1/01 261/116 |
| 2011/0308210 | A1* | 12/2011 | Crabtree ............ B01D 46/0005 55/483 |
| 2013/0055692 | A1 | 3/2013 | Cecchi et al. |
| 2014/0216259 | A1 | 8/2014 | Iwaki |
| 2015/0306533 | A1* | 10/2015 | Matlin .................. B01D 46/448 96/420 |
| 2016/0184753 | A1* | 6/2016 | Chu .................... B01D 46/002 96/74 |

FOREIGN PATENT DOCUMENTS

| | | |
|---|---|---|
| CN | 104406235 | 3/2015 |
| CN | 104603545 | 5/2015 |
| DE | 9312051 | 10/1993 |
| EP | 1 950 500 | 7/2008 |
| EP | 2 072 920 | 6/2009 |
| EP | 2 476 968 | 7/2012 |
| EP | 2 837 897 | 2/2015 |
| EP | 2 853 835 | 4/2015 |
| GB | 2 345 005 | 6/2000 |
| GB | 2516058 | 1/2015 |
| JP | H06-50180 | 6/1994 |
| JP | 2000-354724 | 12/2000 |
| JP | 2006-022977 | 1/2006 |
| JP | 2007-105578 | 4/2007 |
| JP | 2012-120720 | 6/2012 |
| JP | 2013-217580 | 10/2013 |
| JP | 2014-507277 | 3/2014 |
| JP | 2014-119224 | 6/2014 |
| JP | 2015-080737 | 4/2015 |
| JP | 2015-108497 | 6/2015 |
| JP | 5740503 | 6/2015 |
| KR | 20-1993-0002444 | 5/1993 |
| KR | 10-0139487 | 6/1998 |
| KR | 20-0173274 | 3/2000 |
| KR | 20-0289687 | 9/2002 |
| KR | 20-0342073 | 2/2004 |
| KR | 10-2004-0056151 | 6/2004 |
| KR | 10-2004-0108462 | 12/2004 |
| KR | 10-0508312 | 8/2005 |
| KR | 10-2005-0115343 | 12/2005 |
| KR | 10-2006-0023457 | 3/2006 |
| KR | 10-2009-0058446 | 6/2009 |
| KR | 10-2010-0056797 | 5/2010 |
| KR | 10-2010-0062121 | 6/2010 |
| KR | 10-2010-0070069 | 6/2010 |
| KR | 10-2012-0060279 | 6/2012 |
| KR | 10-2012-0071992 | 7/2012 |
| KR | 10-1168738 | 7/2012 |
| KR | 10-2012-0136137 | 12/2012 |
| KR | 10-2013-0036447 | 4/2013 |
| KR | 10-1342606 | 12/2013 |
| KR | 10-2014-0039703 | 4/2014 |
| KR | 10-1385290 | 4/2014 |
| KR | 10-2014-0092953 | 7/2014 |
| KR | 10-2014-0094414 | 7/2014 |
| KR | 10-2015-0005594 | 1/2015 |
| KR | 10-1500501 | 3/2015 |
| KR | 10-1512664 | 4/2015 |
| KR | 10-1516365 | 5/2015 |
| KR | 10-2016-0012796 | 2/2016 |
| KR | 10-2016-0015084 | 2/2016 |
| KR | 10-2016-00175870 | 2/2016 |
| KR | 10-1599634 | 3/2016 |
| KR | 10-2016-0048499 | 5/2016 |
| KR | 10-2016-0053649 | 5/2016 |
| WO | WO 2010/109944 | 9/2010 |
| WO | WO 2015/171571 | 11/2015 |

OTHER PUBLICATIONS

United States Office Action dated Jan. 20, 2017 issued in U.S. Appl. No. 15/364,369.
United States Office Action dated Jan. 23, 2017 issued in U.S. Appl. No. 15/364,410.
United States Office Action dated Jan. 23, 2017 issued in U.S. Appl. No. 15/364,467.
United States Office Action dated Feb. 10, 2017 issued in co-pending U.S. Appl. No. 15/363,111.
Korean Office Action dated Jan. 26, 2017 issued in Application No. 10-2016-0073055.
Korean Office Action dated Jan. 26, 2017 issued in Application No. 10-2016-0073083.
Korean Office Action dated Jan. 26, 2017 issued in Application No. 10-2016-0077888.
International Search Report dated Mar. 21, 2017 issued in Application No. PCT/KR2016/013907.
International Search Report dated Mar. 20, 2017 issued in Application No. PCT/KR2016/013906.
International Search Report dated Mar. 30, 2017 issued in Application No. PCT/KR2016/013912.
International Search Report dated Mar. 30, 2017 issued in Application No. PCT/KR2016/013908.
Korean Office Action dated Apr. 20, 2017 issued in Application No. 10-2016-0132790.
European Search Report dated Jun. 21, 2017 issued in Application No. 16201095.3.
European-Search Report dated Apr. 25, 2017 issued in Application No. 16201086.2-1602.
European Search Report dated Apr. 25, 2017 issued in Application No. 17157045.0-1602.
Korean Office Action dated Jun. 21, 2017 (10-2017-0056865).
Korean Office Action dated Jun. 21, 2017 (10-2017-0056885).
Korean Office Action dated Jun. 21, 2017 (10-2017-0056886).
U.S. Appl. No. 15/363,111, filed Nov. 29, 2016.
U.S. Appl. No. 15/363,156, filed Nov. 29, 2016.
U.S. Appl. No. 15/659,869, filed Jul. 26, 2017.
U.S. Appl. No. 15/659,878, filed Jul. 26, 2017.
U.S. Appl. No. 15/364,467, filed Nov. 30, 2016.
U.S. Appl. No. 15/660,105, filed Jul. 26, 2017.
U.S. Appl. No. 15/660,122, filed Jul. 26, 2017.
U.S. Appl. No. 15/363,438, filed Nov. 29, 2016.
U.S. Appl. No. 15/363,587, filed Nov. 29, 2016.
U.S. Appl. No. 15/659,989, filed Jul. 26, 2017.
U.S. Appl. No. 15/660,076, filed Jul. 26, 2017.
U.S. Appl. No. 15/660,207, filed Jul. 26, 2017.
U.S. Appl. No. 15/660,287, filed Jul. 26, 2017.
U.S. Appl. No. 15/660,362, filed Jul. 26, 2017.
U.S. Appl. No. 15/660,462, filed Jul. 26, 2017.
U.S. Appl. No. 15/363,643, filed Nov. 29, 2016.
U.S. Appl. No. 15/364,369, filed Nov. 30, 2016.
U.S. Appl. No. 15/364,410, filed Nov. 30, 2016.
U.S. Appl. No. 15/441,957, filed Feb. 24, 2017.
U.S. Office Action issued in U.S. Appl. No. 15/364,369, dated Jul. 14, 2017.
European Search Report dated Jun. 21., 2017 issued in Application No. 16201093.8.
Korean Office Action dated Jun. 21, 2017 issued in Application No. 10-2017-0056789.
Korean Office Action dated Jun. 21, 2017 issued in Application No. 10-2017-0056790.
Korean Office Action dated Jun. 21, 2017 issued in Application No. 10-2017-0056791.

(56) References Cited

OTHER PUBLICATIONS

European Search Report dated Jun. 23, 2017 issued in Application No. 16201089.6.
European Search Report dated Jun. 23 2017 issued in Application No. 16201088.8.
Korean Office Action dated Jun. 30, 2017 issued in Application No. 10-2017-0056864.
European Search Report dated Jul. 14, 2017 issued in Application No. 16201094.6.
European Search Report dated Jul. 20, 2017 issued in Application No. 16201091.2.
Korean Notice of Allowance dated Aug. 15, 2017 issued in Application No. 10-2016-0074369.
Korean Office Action dated Aug. 22, 2017 issued in Application No. 10-2016-0073055.
European Search Report dated Jul. 14, 2017 issued in Application No. 16201092.0.
Korean Office Action dated Aug. 31, 2017 issued in Application No. 10-2016-0075063.
European Search Report dated Jul. 211, 2017 issued in Application No. 16201090.4.
Korean Office Action dated Aug. 31, 2017 issued in Application No. 10-2016-0073090.

* cited by examiner

AIR CLEANER

CROSS-REFERENCE TO RELATED APPLICATION(S)

The present application claims priority under 35 U.S.C. 119 and 35 U.S.C. 365 to Korean Patent Application No. 10-2016-0073063 filed in Korea on Jun. 13, 2016, No. 10-2016-0023663 filed in Korea on Feb. 26, 2016, and No. 10-2016-0139376 filed on Oct. 25, 2016, which are hereby incorporated by reference in their entirety.

BACKGROUND

1. Field

An air cleaner is disclosed herein.

2. Background

An air cleaner is a device that suctions in and purifies contaminated air and then discharges purified air. For example, the air cleaner may include a blower that introduces outside air into the air cleaner and a filter capable of filtering dust and bacteria, for example.

Generally, the air cleaner is configured to purify an indoor space, such as a home or an office. According to the air cleaner in the related art, there is a problem that a capacity thereof is limited, and thus, purification of air in an entire indoor space is limited. Accordingly, air around the air cleaner is purified whereas air in a space away from the air cleaner is not purified.

In order to solve this problem, there are efforts to improve a performance of a fan provided in the air cleaner. However, noise generated by the fan gradually increases as a blowing amount of the fan increases. Accordingly, there is a problem is that reliability of the product is decreased. Finally, there is inconvenience that the air cleaner has to be moved by a user in order to purify air in the desired space.

A related art air cleaner is disclosed in Korean Publication No. KR10-2012-0071992 published on Jul. 3, 2012 and entitled AIR CLEANER, which is hereby incorporated by reference. According to this disclosure, air cleaning components, such as the fan and a filter are installed, in an inside of a case having a substantially rectangular parallelepiped shape of a main body of the air cleaner. Air suction ports are formed on a side portion and a lower portion of the main body of the air cleaner and an air discharge port is formed on an upper portion of the main body thereof.

According to this configuration, there is a problem in that a suction capacity is reduced as the contaminated air is suctioned from a limited direction, that is, from a side direction and a lower direction relative to the air cleaner. A corner portion of the case having a rectangular parallelepiped shape provides structural resistance interfering with the suction of air.

In addition, there is a problem that an air cleaning function is limited as purified air does not flow to a space away from the air cleaner, whereas air around the air cleaner is purified. That is, the air which is purified in the air cleaner is discharged in only one direction, that is, only in an upward direction. Further, there is a problem that a blowing capacity is limited as only one blowing fan is provided in the main body of the air cleaner.

BRIEF DESCRIPTION OF THE DRAWINGS

Embodiments will be described in detail with reference to the following drawings in which like reference numerals refer to like elements, and wherein.

DETAILED DESCRIPTION

Figure 1:
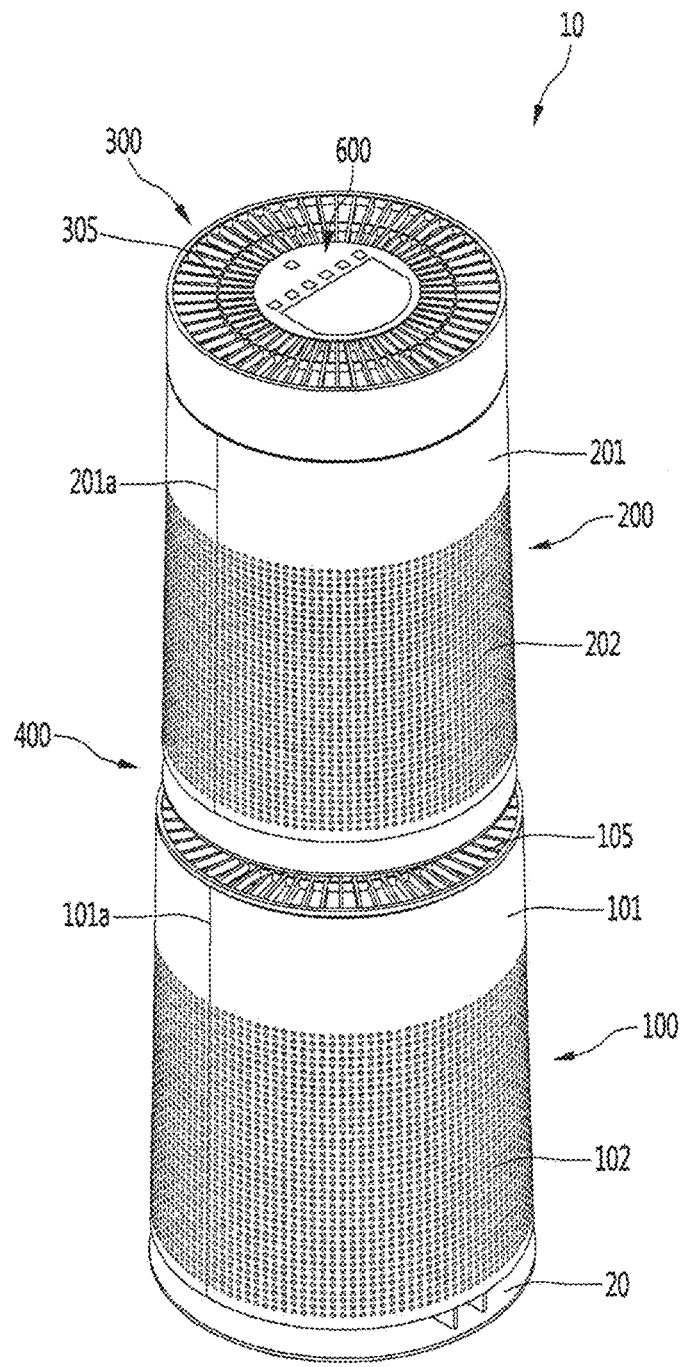
FIG. 1 is a perspective view of an air cleaner according to an embodiment.

Hereinafter, embodiments will be described in detail with reference to the illustrative drawings. Regarding the reference numerals assigned to the components in the drawings, it should be noted that the same components may be designated by the same reference numerals, wherever possible, even though they are shown in different drawings. Also, in the description of embodiments, specific description of known related configuration or functions may be omitted when it is deemed that such description may cause ambiguous interpretation of the present invention.

Also, in the description of embodiments, terms such as first, second, A, B, (a), (b) or the like may be used herein when describing components. Each of these terminologies is not used to define an essence, order or sequence of a corresponding component but used merely to distinguish the corresponding component from other component(s). In a case where it is described that any component is "connected" or "coupled" to another component, the component may be directly or indirectly connected or coupled to another component. However, it is to be understood that another component may be "connected" or "coupled" between the components.

FIG. 1 is a perspective view of an air cleaner according to an embodiment. With reference to FIG. 1, the air cleaner 10 according to this embodiment may include blowing devices or blowers 100 and 200 that generate air flow and a flow adjusting device or adjuster 300 that adjusts a discharge direction of the air flow generated in the blowing devices 100 and 200. The blowing devices 100 and 200 may include a first blowing device 100 that generates a first air flow and a second blowing device 200 that generates a second air flow.

The first blowing device 100 and the second blowing device 200 may be provided in a vertical direction. For example, the second blowing device 200 may be provided on or at an upper side of the first blowing device 100. In this case, the first air flow is a flow of indoor air suctioned from a lower side of the air cleaner 10 and the second air flow is a flow of indoor air suctioned from an upper side of the air cleaner 10.

The air cleaner 10 may include cases 101 and 201 that form an outer appearance thereof. That is, the cases 101 and 201 may include a first case 101 that forms an outer appearance of the first blowing device 100. The first case 101 may have a cylindrical shape. An upper portion of the first case 101 may have a diameter which is less than a diameter of a lower portion thereof. That is, the first case 101 may have a truncated cone shape.

The first blowing device 100 and the second blowing device 200 may be referred to as a "first air cleaning module or cleaner 100" and a "second air cleaning module or cleaner 200", respectively, in that the first blowing device 100 and the second blowing device 200 perform a function of cleaning air in a space to be cleaned. The first blowing device 100 may be referred to as a "lower air cleaning module or cleaner" or "lower module or cleaner" in that the first blowing device 100 is provided at a lower portion of the air cleaner 10 and the second blowing device 200 may be referred to as an "upper air cleaning module or cleaner" or "upper module or cleaner" in that the second blowing device 200 is provided at an upper portion of the air cleaner 10. The flow adjusting device 300 may be referred to as "flow adjusting module or adjuster 300" or "flow control module 300".

The first case 101 may include a first separation portion 101*a* at which two parts which constitute the first case 101 may be assembled or disassembled. The first case 101 may further include a hinge portion or hinge which is provided on an opposite of the first separation portion 101*a*. The two parts may be capable of being relatively rotated about the hinge portion.

When at least any one part of the two parts rotates, the first case 101 may be opened and separated from the air cleaner 10. A locking device or lock may be provided at a portion at which the two parts are coupled, that is, a side opposite to the hinge portion. The locking device may include a locking projection or a magnet or coupler. Components of the first blowing device 100 may be replaced or repaired by opening the first case 101.

The first case 101 may include a first suction portion or inlet 102 through which air may be suctioned in a radial direction. The first suction portion 102 may include one or more through hole formed to pass through at least a portion of the first case 101. A plurality of first suction portions 102 may be provided.

The plurality of first suction portions 102 may be evenly provided in a circumferential direction along an outer circumferential surface of the first case 101 so that air suction may be performed in any direction relative to the first case 101. That is, air may be suctioned in 360 degree directions relative to a center line that extends in the vertical direction and passes through an inside center of the first case 101.

Accordingly, a suction amount of air may be increased by the first case 101 having a cylindrical shape and the plurality of first suction portions 102 formed along the outer circumferential surface of the first case 101. Flow resistance to suctioned air may be reduced by avoiding a cube shape having edges or edge portions such as the case of the related art air cleaner.

Air which is suctioned in through the first suction portion 102 may flow substantially in the radial direction from the outer circumferential surface of the first case 101. Directions may be defined as follows. Referring to the FIG. 1, the vertical direction may refer to an axial direction and a transverse direction may refer to the radial direction. The axial direction may correspond to a central axis direction of the first fan 160 and the second fan 260, which are described hereinafter, that is, a motor shaft direction of the fan. The radial direction may refer to a direction which is perpendicular to the axial direction. The circumferential direction may refer to a virtual circle direction which is formed when rotating about the axial direction and having a distance of the radial direction as a rotational radius.

The first blowing device 100 may include a base 20 provided at a lower side of the first case 101 and placed on the ground. The base 20 may be positioned spaced apart from a lower end portion or end of the first case 101 in a downward direction. A base suction portion or inlet 103 may be formed in a space between the first case 101 and the base 20.

Air which is suctioned in through the base suction portion 103 may flow in an upward direction through a suction port 112 of a suction grill 110 (see FIG. 2), which may be provided in or at an upper side of the base 20. That is, the first blowing device 100 may include the plurality of suction portions 102 and the base suction portion 103. Air in a lower portion of the indoor space may be easily introduced to the first blowing device 100 through the plurality of suction portions 102 and the base suction portion 103. Accordingly, the suction amount of air may be increased.

A first discharge portion or outlet 105 may be formed at an upper portion of the first blowing device 100. The first discharge portion 105 may be formed on a first discharge grill 195 of a first discharge guide device or guide 190 (see, FIG. 8) which may be provided in the first blowing device 100. The first discharge guide 190 may form an outer appearance of an upper end portion or end of the first blowing device 100. Air discharged through the first discharge portion 105 may flow to the upper side in the axial direction.

The cases 101 and 201 may include a second case 201 which may form an outer appearance of the second blowing device 200. The second case 201 may have a cylindrical shape. An upper portion of the second case 201 may have a diameter which is less than a diameter of a lower portion thereof. That is, the second case 201 may have a truncated cone shape.

The second case 201 may include two parts and a hinge portion or hinge which are capable of being assembled or being disassembled through a second separation portion 201*a*. The second case 201 may be openable similar to the first case 101. The second case 201 may be the same or similar to the first case 101, and thus, repetitive disclosure has been omitted. Inner components of the second blowing device 200 may be replaced or repaired by opening the second case 201.

A diameter of a lower end portion of the second case 201 may be less than a diameter of the upper end portion or end of the first case 101. Accordingly, in a general shape of the cases 101 and 201, a lower cross-sectional area of the cases 101 and 102 may be formed to be greater than an upper cross-sectional area. Accordingly, the air cleaner 10 may be stably supported on the ground.

The second case 201 may include a second suction portion or inlet 202 through which air may be suctioned in the radial direction. The second suction portion 202 may include one or more through hole formed to pass through at least a portion of the second case 201. A plurality of the second suction portion 202 may be provided.

The plurality of second suction portions 202 may be evenly provided in the circumferential direction along an outer circumferential surface of the second case 201 so that air suction may be performed in any direction relative to the second case 201. That is, air may be suctioned in 360 degree directions relative to a center line that extends in the vertical direction and passes through an inside center of the second case 201.

Accordingly, a suction amount of air may be increased by the second case 201 having a cylindrical shape and the plurality of second suction portions 202 formed along the outer circumferential surface of the second case 201. Flow resistance to suctioned air may be reduced by avoiding a cube shape having an edge portions such as the case of the related are air cleaner. Air which is suctioned in through the second suction portion 202 may flow substantially in the radial direction from the outer circumferential surface of the second case 201.

The air cleaner 10 may include a dividing device or divider 400 provided between the first blowing device 100 and the second blowing device 200. By the dividing device 400, the second blowing device 200 may be positioned at the upper side of the first blowing device 100 spaced apart therefrom. The dividing device 400 will be described hereinafter, with reference to the drawings.

The flow adjusting device 300 may be provided at an upper side of the second blowing device 100. An air flow path of the second blowing device 100 may communicate with an air flow path of the flow adjusting device 300. The air passing through the second blowing device 100 may be discharged through a second discharge portion or outlet 305 to the outside via the air flow path of the flow adjusting device 300. The second discharge portion 305 may be provided on or at an upper end portion of the flow adjusting device 300.

Figure 18:
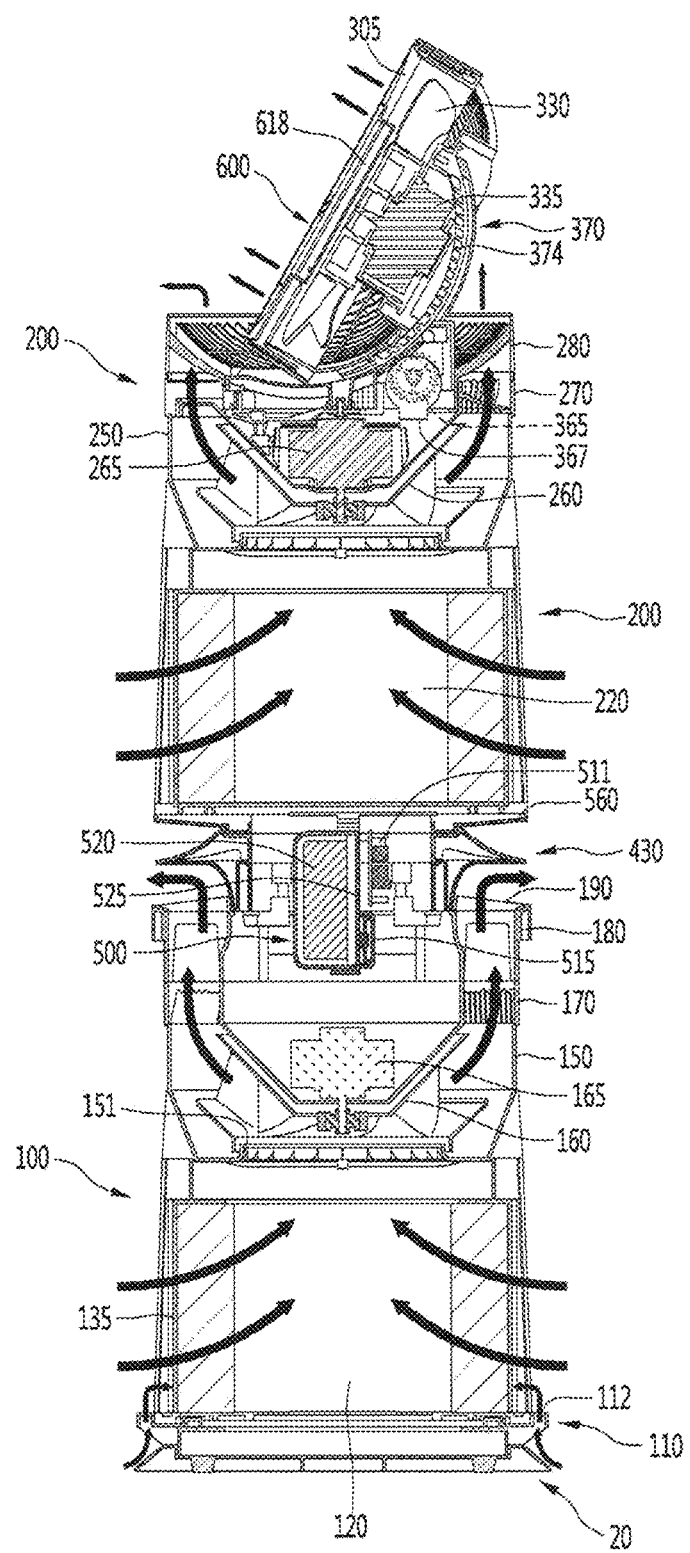

The flow adjusting device 300 may be movable. That is, the flow adjusting device 300 may be movable between a laid-out state (first position), as illustrated in FIG. 1, or an inclined erected state (second position), as illustrated in FIG. 18. In addition, a display device or display 600 that displays operation information of the air cleaner may be provided at an upper portion of the flow adjusting device 300. The display device 600 may be movable together with the flow adjusting device 300.

Figure 2:
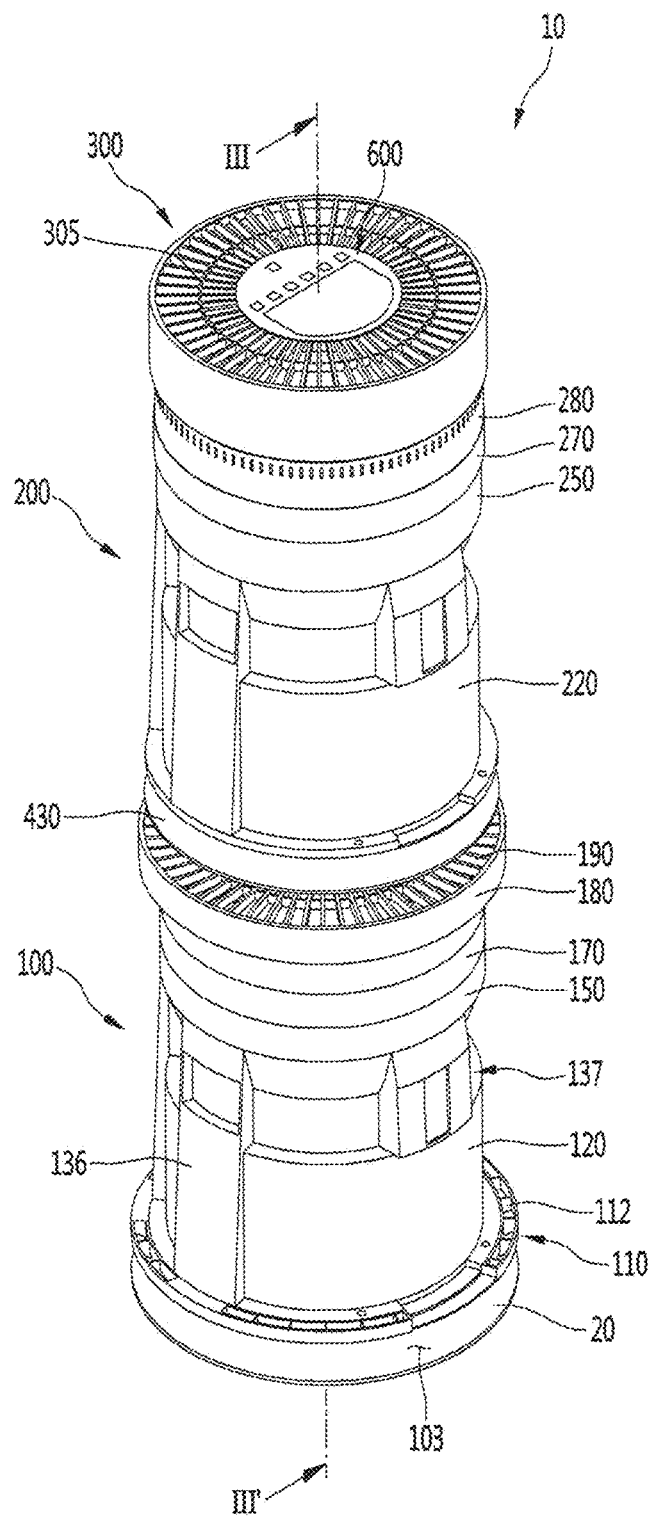
FIG. 2 is a perspective view illustrating an internal configuration of the air cleaner of FIG. 1.
Figure 3:
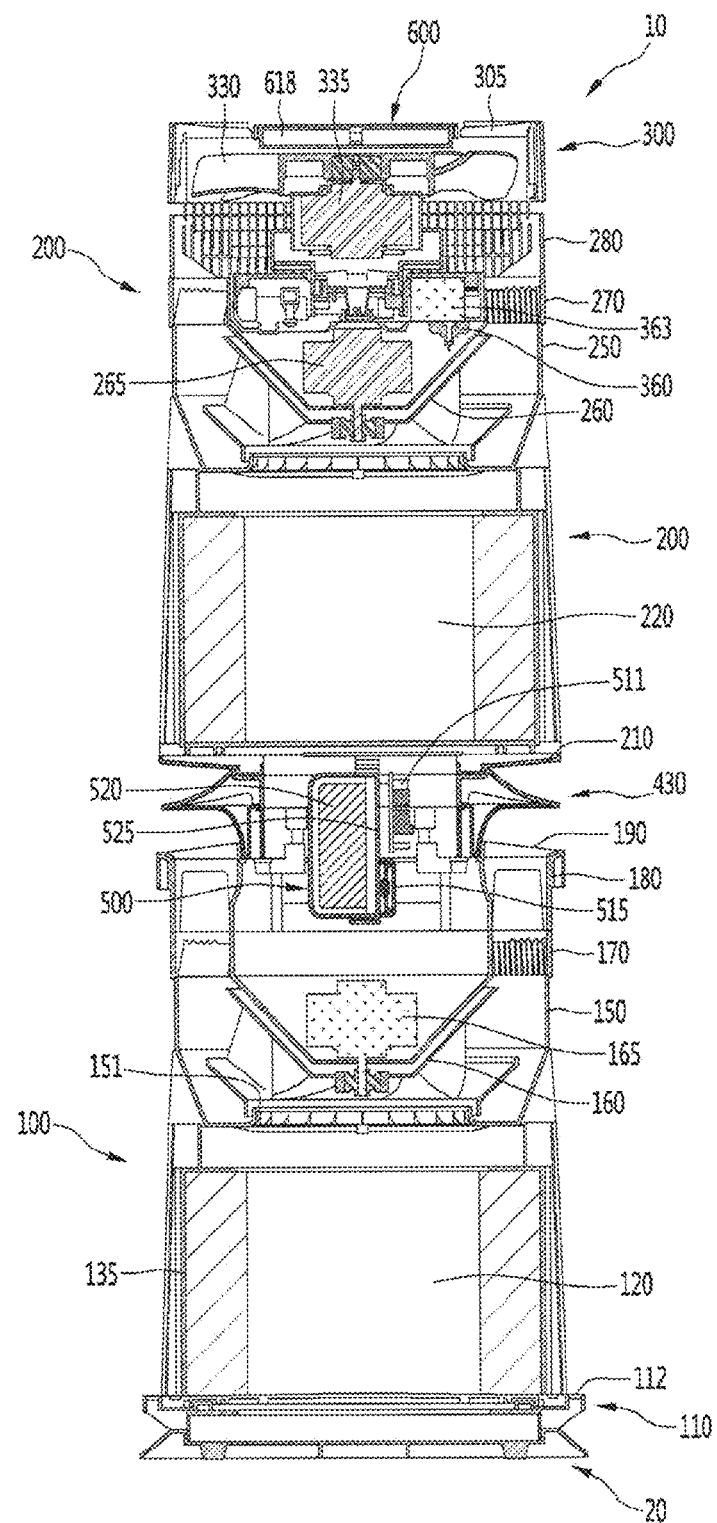
FIG. 3 is a cross-sectional view, taken along line III-III' of FIG. 2.
Figure 4:
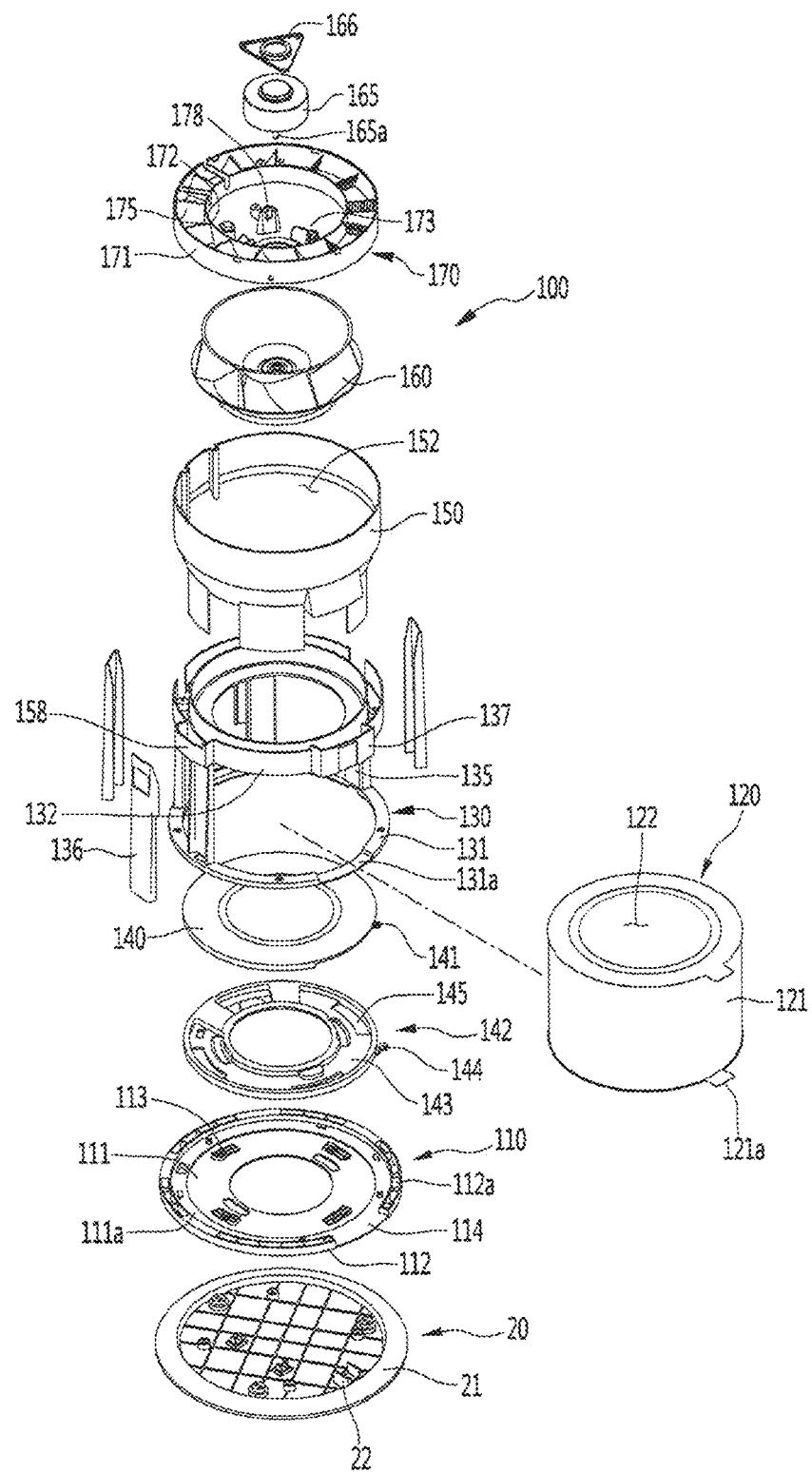
FIG. 4 is an exploded perspective view of a first blowing device of the air cleaner of FIG. 1.
Figure 5:
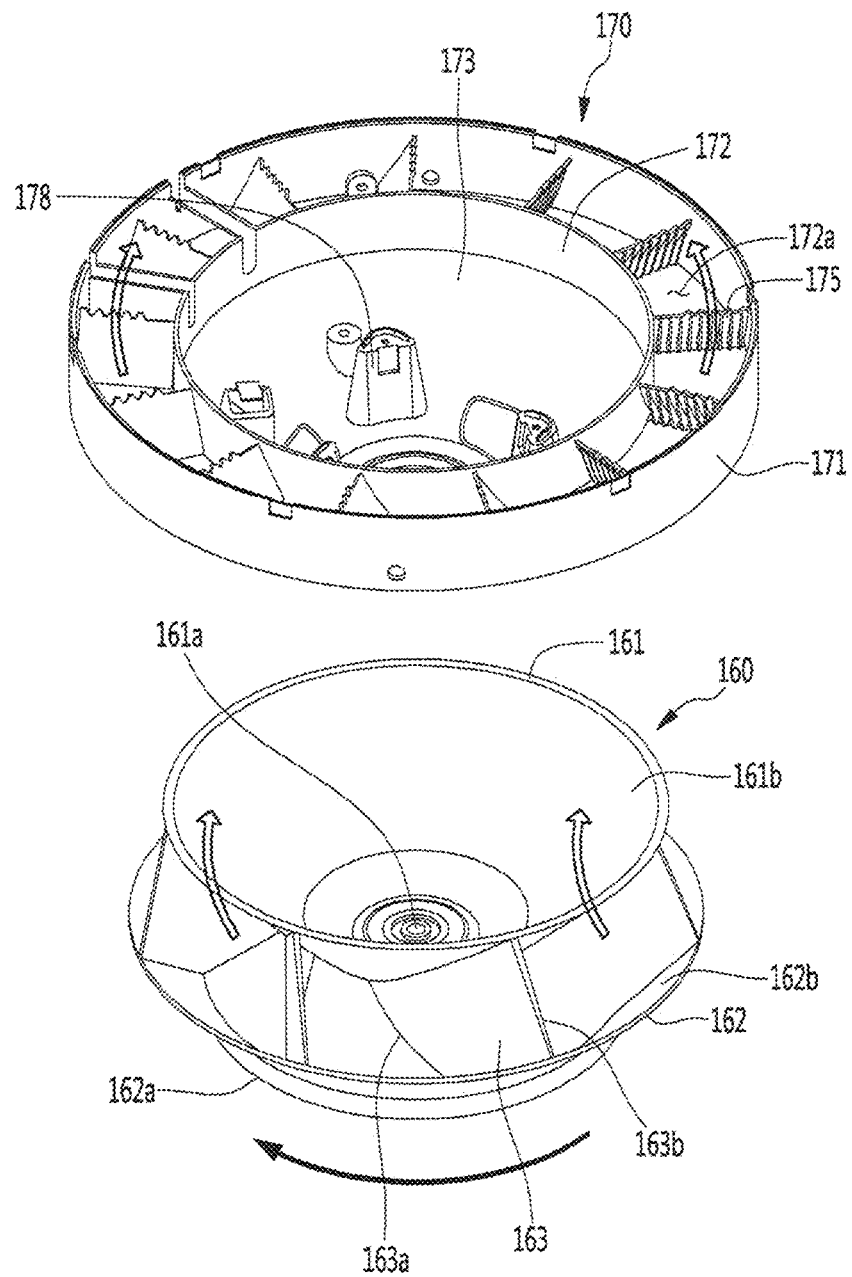
FIG. 5 is an exploded perspective view of a first fan and a first guide of the air cleaner of FIG. 1.
Figure 6:
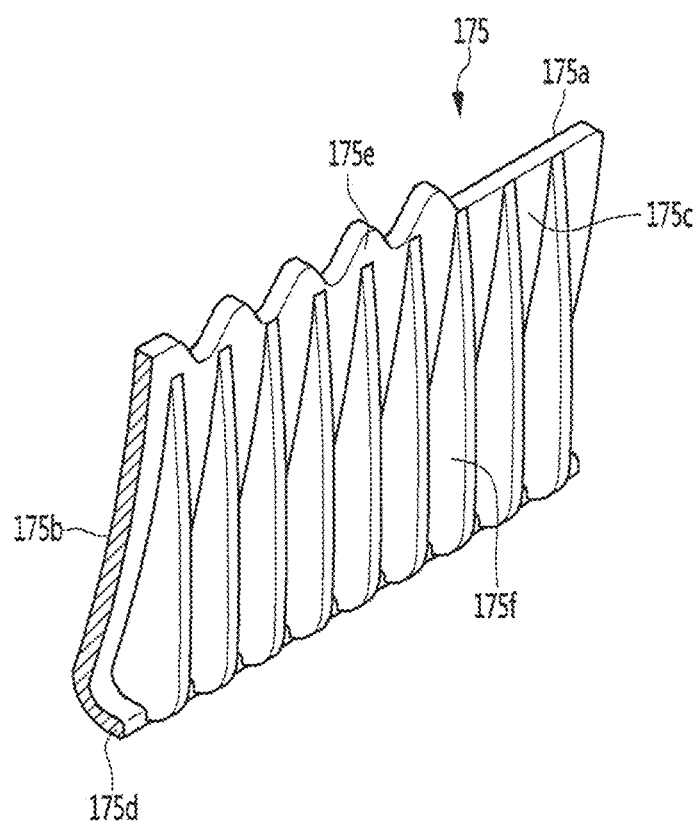
FIG. 6 is a perspective view of a guide rib of the air cleaner of FIG. 1.

FIG. 2 is a perspective view illustrating an internal configuration of the air cleaner of FIG. 1. FIG. 3 is a cross-sectional view, taken along line III-III' of FIG. 2. FIG. 4 is an exploded perspective view of a first blowing device of the air cleaner of FIG. 1. FIG. 5 is an exploded perspective view of a first fan and a first guide device of the air cleaner of FIG. 1. FIG. 6 is a perspective view of a guide rib of the air cleaner of FIG. 1.

Referring to FIGS. 2 to 6, the base 20 and the suction grill 110, which may be provided on or at an upper side of the base 20, may be included in the first blowing device 100 according to this embodiment. The base 20 may include a base main body 21, which may be placed on the ground, and a base projecting portion or projection 22 that projects from the base main body 21 in the upward direction and on which the suction grill 110 may be placed. The base projecting portion 22 may be provided at both sides of the base 20.

The base main body 21 and the suction grill 110 may be spaced apart from each other by the base projecting portion 22. The base suction portion 103 which forms a suction space of air may be included between the base 20 and the suction grill 110.

The suction grill 110 may include a grill main body 111 having a substantially ring shape and a rim portion or rim 110a that protrudes from an outer circumferential surface of the grill main body 111 in the upward direction. By the configuration of the grill main body 111 and the rim portion 111a, the suction grill 110 may have a stepped structure.

The suction grill 110 may include a suction portion or inlet 112 formed on the rim portion 111a. The suction portion 112 may protrude along a circumference of the rim portion 111a in the upward direction and extend in a circumferential direction. In addition, a plurality of suction holes 112a may be formed in the suction portion 112. The plurality of suction holes 112a may communicate with the base suction portion 103.

Air suctioned in through the plurality of suction holes 112a and the base suction portion 103 may pass through a first filter member or filter 120. The first filter may have a cylindrical shape and a filter surface that filters air. The air passing through the plurality of suction holes 112a may be introduced to an inside portion of the first filter 120 by passing through an outer circumferential surface of the cylindrical first filter 120.

The suction grill 110 may further include a movement guide portion or guide 113 that protrudes from a top surface of the grill main body 111 in the upward direction to guide movement of the first filter 120 in the upward or downward direction. The movement guide 113 may be configured to have a shape further protruding in the circumferential direction from the top surface of the grill main body 111. That is, the movement guide 113 may have an inclined surface that protrudes in the circumferential direction.

A plurality of movement guides 113 may be provided to be spaced apart from each other in the circumferential direction. For example, as shown in FIG. 4, four movement guides 113 may be provided. However, a number of the movement guides 113 is not limited thereto.

The grill main body 111 may further include a groove portion or groove 114 which provides a space in which a handle 144 described hereinafter may be movable. The groove 113 forms at least a portion of the grill main body 111, and may be a portion at which the suction portion 112 is not formed in the rim portion of the grill main body 111.

The first blowing device 100 may include a lever device or lever 142, which may be provided on or at an upper side of the suction grill 110 and which may be operable by a user. The lever device 142 may be rotatable in the circumferential direction.

The lever device 142 may include a lever main body 143, which may have a substantially ring shape and be rotatable. In addition, a plurality of cut-out portions or cut-outs disposed or provided at positions corresponding to the plurality of movement guides 113 may be formed in the lever main body 143. The plurality of cut-out portions 145 may be through holes formed in the lever main body 143.

The plurality of cut-out portions 145 may be arranged in the circumferential direction of the lever main body 143 spaced apart from each other. In addition, each of the cut-out portions 145 may be rounded with a predetermined curvature in the circumferential direction, corresponding to the curvature of an outer circumferential surface of the lever main body 143.

The lever device 142 may be supported on the upper surface of the grill main body 111. If the lever device 142 is supported by the grill main body 111, the plurality of movement guides 113 may be inserted into the plurality of cut-out portions 145. The plurality of movement guides 113 may protrude from the plurality of cut-out portions 145 in the upward direction by passing through the plurality of cut-out portions 145.

A length of each of the cut-out portions 145 may be formed longer than a length of the movement guide 113. Thus, the lever device 142 may rotate in a state in which the movement guide 113 is inserted into the cut-out portion 145. In addition, one end portion or end of the movement guide 113 may interfere with one end portion or end of the cut-out portion 145 in a process in which the lever device 142 rotates in one direction, and the other end portion or end of the movement guide 113 may interfere with the other end portion or end of the cut-out portion 145. A second handle 144 may be provided at the outer circumferential surface of the lever main body 143.

A supporting device 140 that supports the first filter 120 may be provided on an upper side of the lever device 142. The supporting device 140 may include a first handle 141 coupled to the second handle 144. A user may grasp the first and second handles 141 and 144 and then rotates the lever main body 143 and the supporting device 140 in a clockwise direction or in a counterclockwise direction.

The lever device 142 may support a lower surface of the supporting device 140. A support projecting portion or projection (not shown), which may be in contact with the movement guide 113, may be provided on the supporting device 140. The support projecting portion may protrude downward from the lower surface of the supporting device 140, and may be provided at a position corresponding to the movement guide 113. In addition, a shape of the support projecting portion may correspond to a shape of the movement guide 113, and the support projecting portion may include an inclined surface formed to further protrude in the circumferential direction.

A direction in which the movement guide 113 gradually projects and a direction in which the support projecting portion gradually projects may be opposite to each other. For example, when the direction in which the movement guide 113 gradually projects is the counterclockwise direction, the direction in which the support projecting portion gradually projects may be clockwise direction.

The support projecting portion may be disposed or provided at a position corresponding to the cut-out portion 145. That is, the movement guide 113 and the support projecting portion may be disposed or provided at a position at which they are inserted into the cut-out portion 145.

The lever device 142 and the supporting device 140 may rotate together. In the rotation process, the movement guide 113 and the support projecting portion may interfere with each other. If a lower portion of the support projecting portion and an upper portion of the movement guide 113 are in contact with each other, the lever device 142 and the supporting device 140 may be lifted in the upward direction. In addition, the first filter 120 supported by the supporting device 140 may be in a state in which the first filter 120 is coupled to the first blowing device 100 while moving in the upward direction.

On the other hand, if the lower portion of the support projecting portion and the upper portion of the movement guide 113 are in contact with each other or if inference between the support projecting portion and the movement guide 113 is released, the lever device 142 and the supporting device 140 may move downward. In addition, the first filter 120 supported by the supporting device 140 may be in a state (released state) in which the first filter 120 is separable from the first blowing device 100.

The first filter 120 may have a cylindrical shape having an open upper portion. The first filter 120 may include a filter main body 121, which may have a cylindrical filter, an inside of which may be empty, and a filter hole 122 formed to be open at an upper end portion or end of the filter main body 121. A filter grasping portion or grasp 121a may be provided at an upper or lower portion of the filter main body 121. Air may be introduced to the inside of the filter main body 121 through an outer circumferential surface of the film main body 121, and may be discharged from the first filter 120 through the filter hole 122.

The first blowing device 100 may further include a first filter frame 130, which may form a mounting space for the first filter 120. More specifically, the first filter frame 130 may include a first frame 131, which may form a lower portion of the first filter frame 130 and a second frame 132, which may form an upper portion of the first filter frame 130.

The first frame 131 may include a frame depression portion or depression 131a having a downwardly depressed shape. The frame depression portion 131 may be configured such that at least a portion of the first frame 131 is depressed. The frame depression portion 131a may be formed at a position corresponding to the groove portion 114 of the suction grill 110. The groove portion 114 and the frame depression portion 131a may provide a space portion or space in which the first and second handles 141 and 144 may be movable. The first and second handles 141 and 144 may be located in the space portion, to rotate in the clockwise direction or in the counterclockwise direction.

The second frame 132 may be spaced apart from the first frame 131 in the upward direction. The second frame 132 may have a substantially ring shape. The ring-shaped inside portion space of the second frame 132 may form at least a portion of an air flow path passing through the first filter frame 130. In addition, an upper portion of the second frame 132 may support a first fan housing 150 described hereinafter.

The first filter frame 130 may further include a first filter supporting portion or support 135 that extends from the first frame 131 to the second frame 132 in the upward direction. The first frame 131 and the second frame 132 may be spaced apart from each other by the first filter supporting portion 135. A plurality of first filter supporting portions 135 may be provided and the plurality of the first filter supporting portions 135 may be arranged in the circumferential direction, and thus, may be connected to rim portions or rims of the first frame 131 and the second frame 132. A mounting space of the first filter 120 may be defined by the plurality of first filter supporting portions 135 and the first frame 131 and the second frame 132.

A sensor device or sensor 137 may be installed or provided in or on the first filter frame 130. The sensor device 137 may include a dust sensor that senses an amount of dust in the air and a gas sensor that senses an amount of gas in the air. The dust sensor and the gas sensor may be disposed or provided to be supported by the second frame 132 of the first filter frame 130.

The first filter 120 may be detachably mounted in the mounting space. The first filter 120 may have a cylindrical shape and air may be introduced through the outer circumferential surface of the first filter 120. Impurities, such as fine dust in air, may be filtered in a process of passing through the first filter 120.

The air may be introduced from any direction relative to the first filter 120, by the first filter 120 having the cylindrical shape. Accordingly, a filtering area of air may be increased.

The mounting space may have a cylindrical shape corresponding to the shape of the first filter 120. The first filter 120 may be slidably introduced toward the mounting space in a mounting process. In contrast, the first filter 120 may be slidably withdrawn from the mounting space in a separating process.

That is, when the first and second handles 141 and 144 are operated in a state in which the first filter 120 is located on the upper surface of the supporting device 140, the first filter 120 may be in a released position with the first filter 120 being moved in the downward direction. The first filter 120 may be slid to the outside in the radial direction and may be separated from the mounting space.

In contrast, when separated from the mounting space the first filter 120 may be slid toward the mounting space to the inside in the radial direction, supported on the upper surface of the supporting device 140, and thus, may be in close contact upwardly by an operation of the first and second handles 141 and 144. At this time, the first filter 120 is in a coupling position. A first supporting portion cover 136 may be coupled with the outside of the first filter supporting portion 135.

The first blowing device 100 may further include a first fan housing 150, which may be installed or provided on or at an outlet side of the first filter 120. A housing space portion or space 152, in which a first fan 160 may be accommodated, may be formed in the first fan housing 150. In addition, the first fan housing 150 may be supported by the first filter frame 130.

A first fan introducing portion 151 that guides introduction of air to an inside of the first fan housing 150 may be included in a lower portion of the first fan housing 150. A grill may be provided in or on the first fan introducing portion 151 to prevent, for example, a finger of a user from being put into the inside of the first fan housing 150 when the first filter 150 is separated.

The first blowing device 100 may further include an ionizer 158 that removes or sterilizes smell particles in the air. The ionizer 158 may be coupled to the first fan housing 150 and be capable of acting on the air which flows inside of the first fan housing 150.

The sensor device 137 and the ionizer 158 may also be installed or provided in a second blowing device 200 described hereinafter. For example, the sensor device 137 and the ionizer 158 may be installed or provided in one of the first blowing device 100 or the second blowing device 200.

The first fan 160 may be located on or at an upper side of the first fan introducing portion 151. For example, the first fan 160 may include a centrifugal fan that introduces air in the axial direction and then discharges air to the upper side in the radial direction.

The first fan 160 may include a hub 161 to which a rotational shaft 165a of a first fan motor 165, which may be a centrifugal fan motor, may be coupled, a shroud 162 which may be disposed or provided in a state of being spaced apart from the hub 161, and a plurality of blades 163, which may be disposed or provided between the hub 161 and the shroud 162. The first fan motor 165 may be coupled to the upper side of the first fan 160.

The hub 161 may have a bowl shape, a diameter of which may be gradually reduced in the downward direction. The hub 161 may include a shaft coupling portion to which the rotational shaft 165a may be coupled and a first blade coupling portion that extends at an incline from the shaft coupling portion in the upward direction.

The shroud 162 may include a lower end portion or lower end, on or at which a shroud suction port 162a, into which air having passed through the first fan introducing portion 151 may be suctioned, may be formed and a second blade coupling portion that extends from the lower end portion in the upward direction.

A first surface of each blade 163 may be coupled to the first blade coupling portion of the hub 161 and a second surface thereof may be coupled to the second blade coupling portion of the shroud 162. The plurality of blades 163 may be disposed or provided spaced apart in a circumferential direction of the hub 161.

Each blade 163 may include a leading edge 163a, which forms a side end portion or side end, to which air is introduced, and a trailing edge 163b, which forms a side end portion or side end, from which air is output. The air having passed through the first filter 120 may be introduced to the first fan housing 150 through the first fan introducing portion 151 with the air flowing in the upward direction. The air may flow in the axial direction of the first fan 160, may be introduced to the first leading edge 163a, and may be output to the trailing edge 163b via the blade 163. The trailing edge 163b may extend at an inclined to the outside with respect to the axial direction in the upward direction corresponding to a flow direction of air so that the air which is output through the trailing edge 163b is capable of flowing to the upper side in the radial direction.

Reference to FIG. 5, the first blowing device 100 may further include a first air guide device or guide 170 which may guide a flow of air having passed through the first fan 160 by being coupled to the upper side of the first fan 160. The first air guide 170 may include an outer wall 171 having a cylindrical shape and an inner wall 172 positioned on or at an inside of the outer wall 171 and having a cylindrical shape. The outer wall 171 may be disposed or provided to surround the inner wall 172. A first air flow path 172a, through which air may flow, may be formed between an inner circumferential surface of the outer wall 171 and an outer circumferential surface of the inner wall 172.

The first air guide 170 may include a guide rib 175 which may be disposed or provided on or in the first air flow path 172a. The guide rib 175 may extend from the outer circumferential surface of the inner wall 172 to the inner circumferential surface of the outer wall 171. A plurality of guide ribs 175 may be disposed or provided spaced apart from each other. The plurality of guide ribs 175 may guide the air introduced to the first air flow path 172a of the first air guide 170 via the first fan 160 in the upward direction.

The guide rib 175 may extend at an incline from a lower portion of the outer wall 171 and the inner wall 172 in the upward direction. For example, the guide rib 175 may be rounded, and thus, guide air so that it flows at an incline in the upward direction.

That is, with reference to FIG. 6, the guide rib 175 may include a rib main body 175a, which may extend rounded in the upward direction. The rib main body 175a may include a positive pressurizing surface 175b which faces in a direction in which an air flow approaches and a negative pressuring surface 175c which is opposite to the positive pressurizing surface 175b. The positive pressurizing surface 175b may have a concave shape and the negative pressurizing surface 175c may have a convex shape.

The rib main body 175a may include a leading edge 175d which forms a side end portion or side end, to which air may be introduced, and a trailing edge 175e which forms a side end portion or side end, to which air may be discharged. The leading edge 175d may be rounded and bent from the positive pressurizing surface 175b toward the negative pressurizing surface 175c. According to this configuration, a portion of air which is introduced via the leading edge 175d may be guided to the positive pressurizing surface 175b and the rest of the air may be guided to the negative pressurizing surface 175c. Air which flows to the negative pressurizing surface 175c may pass by a plurality of projecting portions 175f.

The plurality of projecting portions 175f may project from the negative pressurizing surface 175c and may extend from the leading edge 175d toward the trailing edge 175e. The projecting portion 175f may have an airfoil shape a projecting height of which may be gradually reduced from the leading edge 175d toward the trailing edge 175e. Generation of a vortex on the negative pressurizing surface 175c may be prevented, and thus, air may easily flow toward the upper side, due to the plurality of projecting portions 175f formed on the negative pressurizing surface 175c.

The trailing edge 175e may have a saw tooth shape having peaks and valleys which may be repeated in the radial direction. According to this configuration, a difference between times at which air is output from the trailing edge 175e, that is, air is output from the peaks and valleys from each other may be generated, and thus, generation of noise may be reduced.

The first air guide 170 may further include a motor accommodating portion 173 that extends from the inner wall 172 to the lower side, and thus, accommodates the first fan motor 165. The motor accommodating portion 173 may have a bowl shape, a diameter of which may be gradually reduced in the downward direction. A motor coupling portion 166 may be provided on or at one side of the first fan motor 165 to fix the first fan motor 165 to the first air guide 170. A shape of the motor accommodating portion 173 may correspond to the shape of the hub 161. The motor accommodating portion 173 may be inserted into the hub 161.

The first fan motor 165 may be supported to or at an upper side of the motor accommodating portion 173. The rotational shaft 165a of the first fan motor 165 may extend from the first fan motor 165 in the downward direction and be coupled to the shaft coupling portion 161a of the hub 161 through the lower surface portion of the motor accommodating portion 173.

In addition, a motor coupling portion 166 may be provided on or at an upper side of the first fan motor 165. The motor coupling portion 166 may guide the first fan motor 165 to be fixed to the air guide 170.

Figure 7:
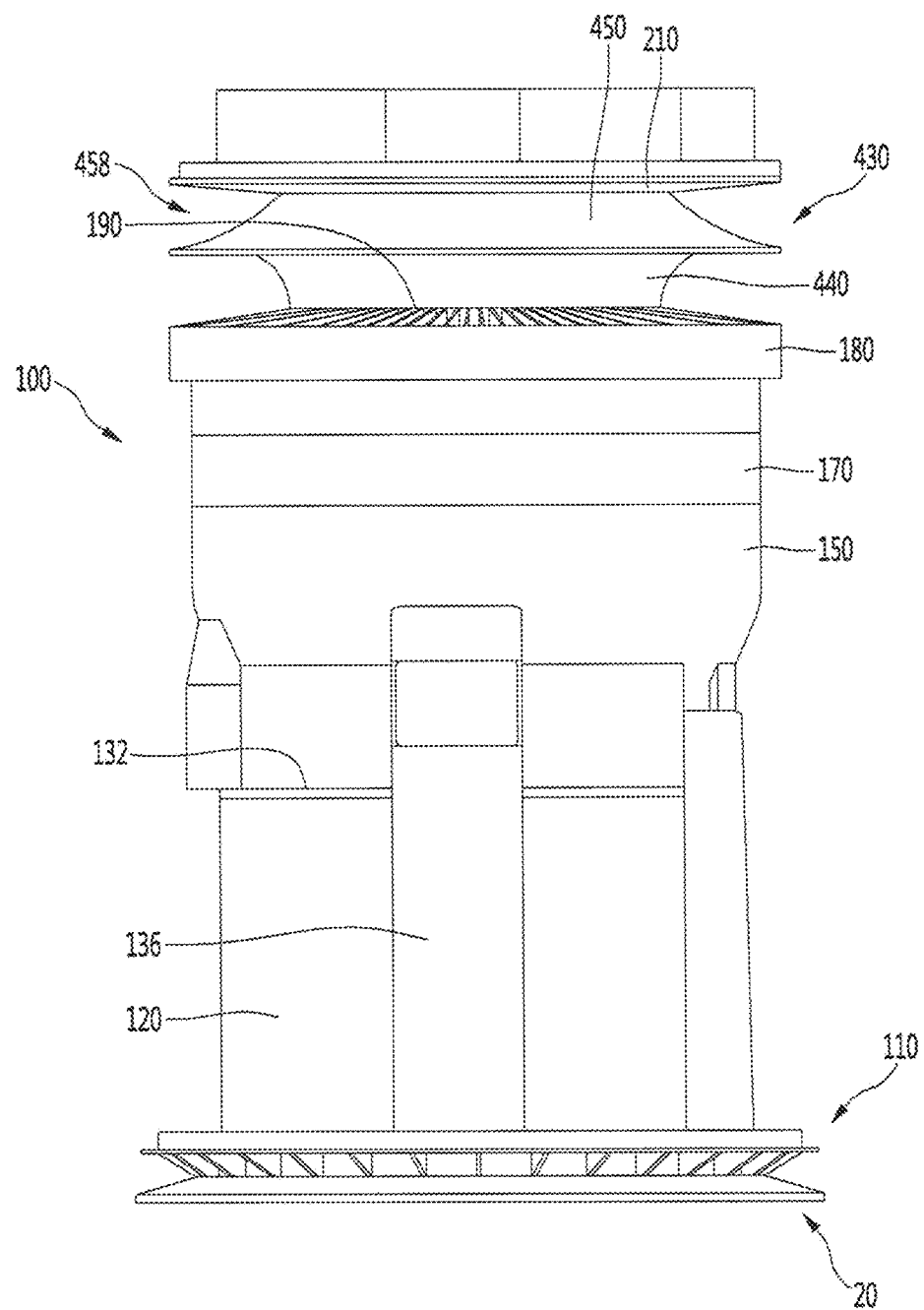
FIG. 7 is a partial view of the air cleaner of FIG. 1.
Figure 8:
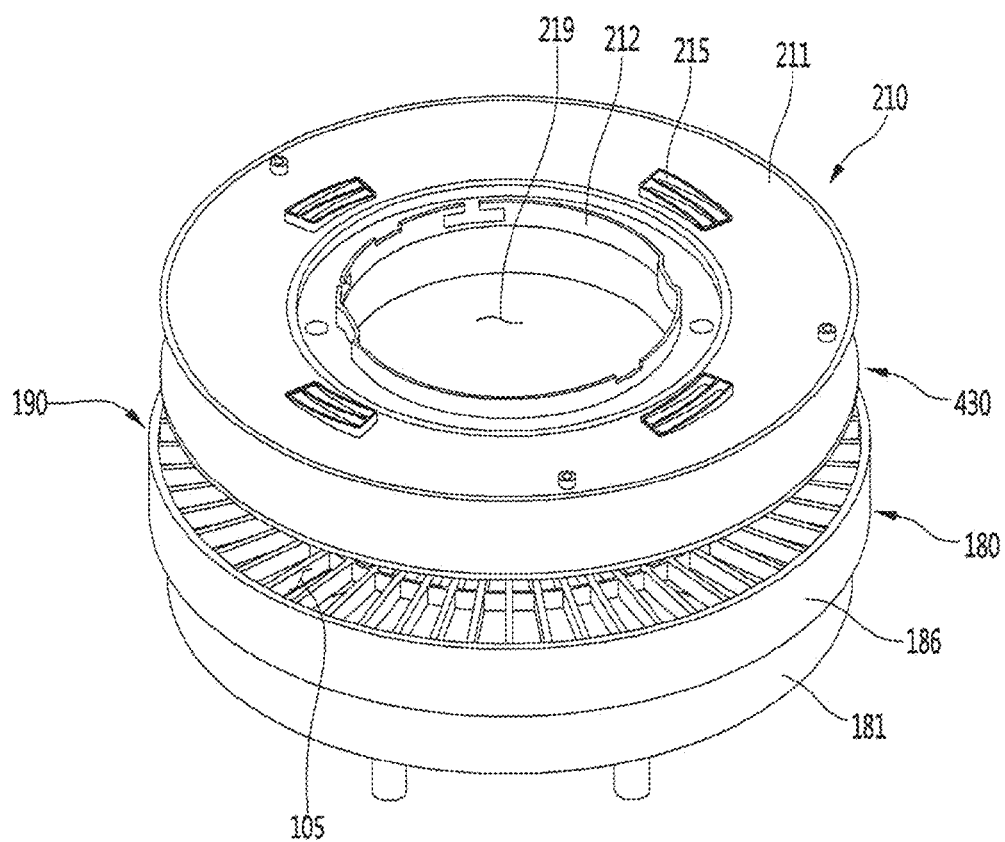
FIG. 8 is a perspective view illustrating a dividing plate and components coupled to the dividing plate according to an embodiment.
Figure 9:
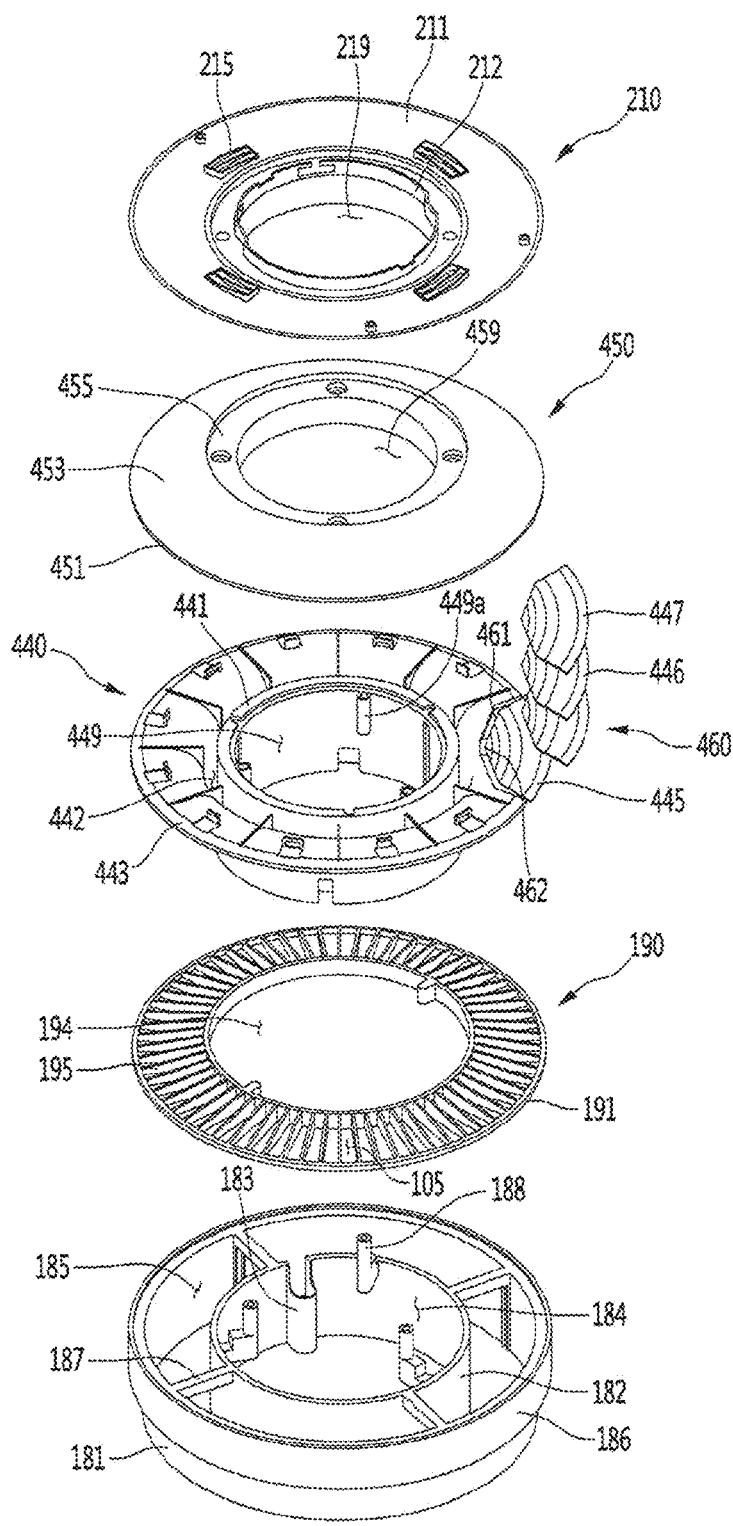
FIG. 9 is an exploded perspective view of the dividing plate and components coupled to the dividing plate of FIG. 8.

FIG. 7 is a partial view of the air cleaner according to an embodiment. FIG. 8 is a perspective view illustrating a dividing plate and components coupled to the dividing plate according to an embodiment. FIG. 9 is an exploded perspective view of the dividing plate and components coupled to the dividing plate of FIG. 8.

Referring to FIGS. 7 to 9, the first blowing device 100 according to this embodiment may further include a second air guide device or guide 180, which may be coupled to the upper side of the first air guide 170 and guide air having passed through the first air guide 170 to the discharge guide 190. The second air guide 180 may include a first guide wall 181, which may have a substantially cylindrical shape, and a second guide wall 182, which may be positioned at an inside of the first guide wall 181 and have a substantially cylindrical shape. The first guide wall 181 may be disposed or provided to surround the second guide wall 182.

A second air flow path 185, through which air may flow, may be formed between an inner circumferential surface of the first guide wall 181 and an outer circumferential surface of the second guide wall 182. Air which flows along the first air flow path 172a of the first air guide 170 may flow in the upward direction through the second air flow path 185. The second air flow path 185 may be referred to as a "discharge flow path." In addition, the first discharge portion 105 may be provided on or at an upper side of the second air flow path 185.

A fastening guide 183, which may be coupled with the first air guide 170, may be provided on a lower portion of the second guide wall 182. The fastening guide 183 may extend to the lower side of the second guide wall 182.

A predetermined fastening member may be coupled to the fastening guide 183, and the fastening member may be coupled to a fastening rib 178 of the first air guide 170. The fastening rib 178 may project from an upper surface of the motor accommodating portion 173 in the upward direction. A plurality of fastening guides 183 and a plurality of fastening ribs 178 may be provided.

The second air guide 180 may further include a wall supporting portion or support 187 that extends from an inner circumferential surface of the first guide wall 181 to an outer circumferential surface of the second guide wall 182. By the wall supporting portion 187, the first and second guide walls 181 and 182 may be stably coupled to each other. A plurality of wall supporting portions 187 may be provided. For example, the plurality of wall supporting portions 187 may include four wall supporting portions 187 extending in four directions. In addition, the first discharge guide 190 may be supported on the plurality of wall support portions 187.

A third space portion or space 184, in which at least a portion of a printed circuit board (PCB) device 500 may be accommodated by passing therethrough in the vertical direction may be formed inside of the second guide wall 182 having a cylindrical shape. The PCB device 500 may include a power supply portion or power supply 520 and a main PCB 511.

The power supply portion 520 may refer to a device that receives commercial power supplied from a power line connected to the air cleaner 10 to supply power to the main PCB 511 and a plurality of components in the air cleaner 10. The power supply 520 may include a PCB (power PCB) for AC power. The main PCB 511 may include a PCB for DC power, which may be driven by a DC voltage converted in the PCB for AC power.

The PCB device 500 may further include a PCB supporting plate 525 that supports the power supply portion 520 and the main PCB 511. The main PCB 511 may be supported on one or a first surface of the PCB supporting plate 525, and the power supply portion 520 may be supported on the other or a second surface of the PCB supporting plate 525.

The PCB device 500 may include a communication module 515 through which the air cleaner 10 is capable of communicating with an external device. For example, the communication module 515 may include a Wi-Fi module. The communication module 515 may be supported on the PCB supporting plate 525, and may be disposed or provided at a lower side of the main PCB 511.

The second air guide 180 may include a bending portion 186 that extends from an upper portion of the first guide wall 181 in an outer direction. The bending portion 186 may extend to the outside in the radial direction from the upper end of the first guide wall 181 and be bent in the downward direction. For example, the bending portion 186 may have a substantially eave shape.

The first blowing device 100 may further include a first discharge guide device or guide 190, which may be disposed or provided on or at an upper side of the second air guide 180, that is, an outlet side of air flow passing through the second air guide 180 relative to the air flow and guide the air discharge to outside of the air cleaner 10.

The first discharging guide 190 may include a first discharge main body 191, which may have a fourth space portion or space 194 formed at a substantially center portion by passing therethrough in the vertical direction. For example, the first discharge main body 191 may have an annular shape.

At least a portion of the PCB device 500 may be accommodated in the fourth space portion 194. The fourth space portion 194 may be formed on or at an upper side of the third space portion 184. The fourth space portion 194 along with the third space portion 184 may form an installation space portion or space, in which the PCB device 500 may be installed or provided.

The first discharge main body 191 may include a first discharge grill 195. The first discharge grill 195 may extend to the outside in the radial direction toward an outer circumferential surface from an inner circumferential surface of the first discharge main body 191.

In addition, a plurality of first discharge grills 195 may be provided, and first discharge portions 105, through which air may be discharged to the outside may be formed between the plurality of first discharge grills 195. The plurality of first discharge grills 195 may be disposed or provided on or at an upper side of the second air flow path 185, and air passing through the second air flow path 185 may be discharged through the first discharge portion 105 while flowing toward the first discharge grill 195.

The second blowing device 200 may include a supporting device or support that supports a lower portion of a second filter member or filter 220 and a lever device or lever 242, which may be provided on or at a lower side of the supporting device. The supporting device may be the same or similar to the supporting device 140 of the first blowing device 100, and therefore, repetitive disclosure has been omitted.

The second blowing device 200 may further includes a lever supporting device or support 210 that supports the second filter 220 or the lever device 242 of the second blowing device 200. The lever supporting device 210 may have a substantially annular shape. The lever supporting device 210 may include a fifth space portion or space formed passing therethrough in the vertical direction and defining an installation space portion or space, in which the PCB device 500 may be located. The fifth space portion 219 may be formed at a substantially center portion of the lever supporting device 210.

The lever supporting device 210 may include a lever supporting main body 211, which may have an annular shape. The lever supporting main body 211 may extend toward an outer circumferential surface from an inner circumferential surface thereof to be slightly inclined in the upward direction relative to the axial direction. That is, the surface constituting the lever supporting main body 211 may form an inclined surface. A space between the inclined surface and the upper surface of a dividing plate 430 described hereinafter may provide a space portion or space in which a user's hand is capable of being located. The lever supporting main body 211 may be referred to as a "blocking portion" in that air which is discharged through the first discharge portion 105 of the first blowing device 100 may be blocked from being introduced to the second blowing device 200.

The lever supporting device 210 may further include a movement guide portion or guide 215 that protrudes from the lever supporting main body 211 in the upward direction. The movement guide 215 may be the same or similar to the movement guide 113 of the first blowing device 100, and, therefore, repetitive disclosure has been omitted. For convenience of description, the movement guide 113 may be referred to as a "first movement guide portion or guide" and the movement guide 565 may be referred to as a "second movement guide portion or guide."

The lever supporting device 210 may further include a supporting projection 212 that protrudes from an inner circumferential surface of the lever support main body 211 in the upward direction. The supporting projection 212 may support the lever device 242 (see FIG. 11) of the second blowing device 200.

A dividing device 400 may be provided between the first blowing device 100 and the second blowing device 200. The dividing device 400 may include a dividing plate 430 that separates or blocks air flow generated in the first blowing device 100 and air flow generated in the second blowing device 200. By the dividing plate 430, the first and second blowing devices 100 and 200 may be spaced apart from each other in the vertical direction.

That is, a separation space in which the dividing plate 430 may be located or provided may be formed between the first and second blowing devices 100 and 200. The first discharge guide 190 of the first blowing device 100 may be located at a lower end portion or end of the separation space, and the lever supporting device 510 of the second blowing device 200 may be located at an upper end portion or end of the separation space.

The separation space may be divided into an upper space and a lower space by the dividing plate 430. The lower space may be a first space portion or space through which air discharged from the first discharge portion 105 of the first discharge guide 190 may pass in a process in which the air flows to the outside of the air cleaner 10. The upper space may be a second space portion or space that functions as a grasping space into which a user may put his or her hand when moving the air cleaner 10.

Air discharged from the first discharge portion 105 may be guided by the dividing plate 430 to flow to the outside of the air cleaner 10. Accordingly, it is possible to prevent the air from being introduced into the second blowing device 200.

The dividing plate 430 may include a first plate 440, and a second plate 450 coupled to the first plate 440. The second plate 450 may be provided on or at an upper side of the first plate 440. In addition, the first plate 440 may extend rounded in the upward direction, and the second plate 450 may extend rounded in the downward direction.

The first plate 440 may include a plate inner wall 441, which may have a substantially annular shape, and a plate outer wall 443, which may surround the plate inner wall 441. A first space portion or space 449 that passes through the first plate 440 in the vertical direction may be formed at a center portion of the plate inner wall 441. The first space portion 449 may provide an installation space in which at least a portion of the PCB device 500 may be located or provided.

The plate outer wall 443 may extend to the outside in the radial direction from the plate inner wall 441. The first plate 440 may further include a wall connecting portion that extends in the radial direction between the lower end portion or end of the plate inner wall 441 and the lower end portion or end of the plate outer wall 443.

The plate outer wall 443 may extend rounded in the upward direction from the wall connecting portion. For example, at least a portion of the plate outer wall 443 may be a curved surface having a predetermined radius of curvature.

The first plate 440 may include a depression portion or depression 442 which defines a space between the plate inner wall 441 and the plate outer wall 443. The depression portion 442 may be depressed in the downward direction in a space between the upper end portion of the plate inner wall 441 and the upper end portion of the plate outer wall 443.

The first plate 440 may include a first coupling portion 449*a*, which may be coupled to the second air guide 180. The first coupling portion 449*a* may be provided on an inner circumferential surface of the plate inner wall 441. In addition, the first coupling portion 449*a* may be coupled to a second coupling portion 188 of the second air guide 180. The second coupling portion 188 may be provided on an inner circumferential surface of the second guide wall 182.

A display device or display 460 that displays information relative to an operation of the air cleaner 10 may be installed or provided at the dividing plate 430. For example, the information may include information on an air pollution level or air cleanliness.

The display device 460 may be installed or provided in a space between the first plate 440 and the second plate 450. A device mounting portion or mount 445, on which the display device 450 may be mounted, may be formed on the first plate 440. The device mounting portion 445 may be formed on an upper surface of the plate outer wall 443.

The display device 460 may include an illumination source 462. The illumination source 462 may be installed or provided at an illumination supporting portion or support 461. The illumination supporting portion 461 may include a mounting groove into which the illumination source 462 may be inserted.

The illumination source 462 may include an LED. The display device 460 may further include a diffusing portion or diffuser 446 provided on or at one side of the illumination source 462 and diffusing light irradiated from the illumination source 462.

The display device 460 may include a reflecting plate 447, which may be provided on or at at least one side of the diffusing portion 446 and reflect light diffused through the diffusing portion 446 so as to concentrate the light on an outer circumferential surface of the dividing plate 430. For example, the reflecting plate 447 may be provided on each of upper and lower sides of the diffusing portion 446. According to this configuration, light irradiated from the illumination source 462 may be concentrated on the diffusing portion 446 by the reflecting plate 447, and is capable of being converted into diffused light while passing through the diffusing portion 446.

The second plate 450 may include a second plate main body 451, which may have a substantially annular shape. The second plate 450 may include a plate mounting portion or mount 455, which may protrude to the inside in the radial direction from an inner circumferential surface of the second plate main body 451. The plate mounting portion 455 may be depressed in the downward direction from an upper end portion or end of the second plate main body 451, and support the lever supporting device 210.

A second space portion or space 459, which may pass through the plate mounting portion 455 in the vertical direction may be formed at a center portion of the plate mounting portion 455. The second space portion 459 may provide an installation space, in which at least a portion of the PCB device 500 may be located or provided. The second space portion 459 may be aligned on or at a lower side of the fifth space portion 219. The first to fifth space portions 449, 459, 184, 194, and 219 may be aligned to communicate with one another in the vertical direction, thereby providing an installation space for the PCB device 500. The first and second space portions 449 and 459 may be in the shape of a through hole formed as a top and bottom of the dividing plate 430 and passing therethrough, and may be referred to as a "dividing plate space portion or space."

The second plate main body 451 may extend at an incline toward the outside in the radial direction. The second plate main body 451 may include an inclined surface 453 that extends at an incline in the downward direction toward an outer circumferential surface from an inner circumferential surface of the second plate main body 451. For example, the inclined surface 453 may have a surface that extends rounded.

A space portion or space 458 may be formed between the lower surface of the lever supporting main body 211 and the inclined surface 453. The second space portion may be referred to as a "grasping space portion or space."

Figure 10:
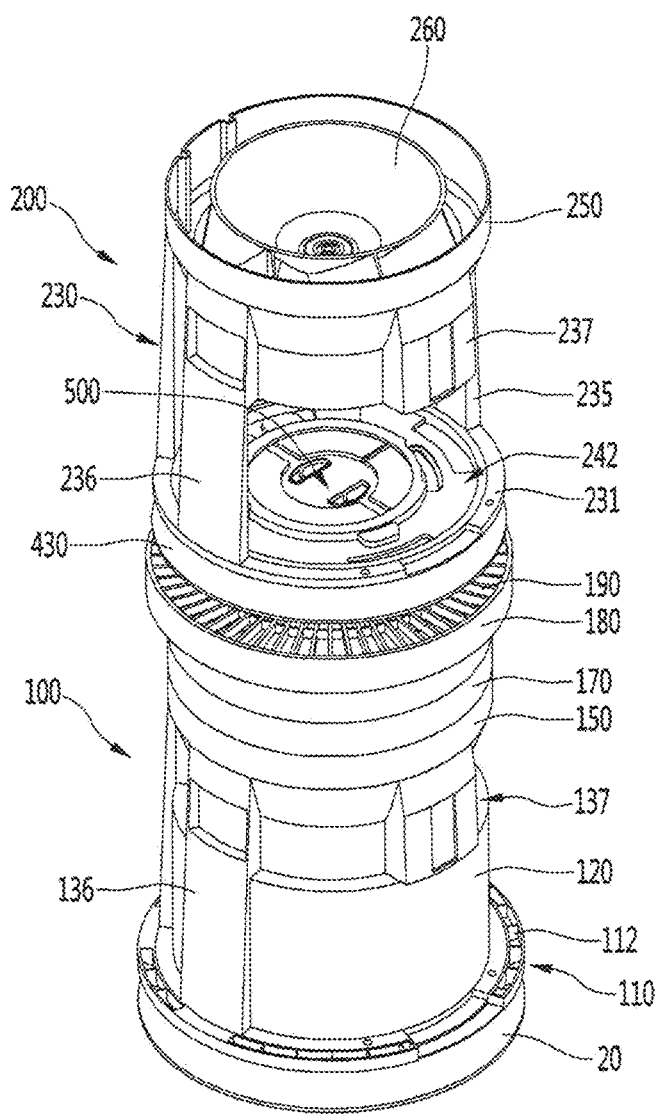
FIG. 10 is a view illustrating a state in which a printed circuit board (PCB) device is installed in an inner space of the air cleaner of FIG. 1.
Figure 11:
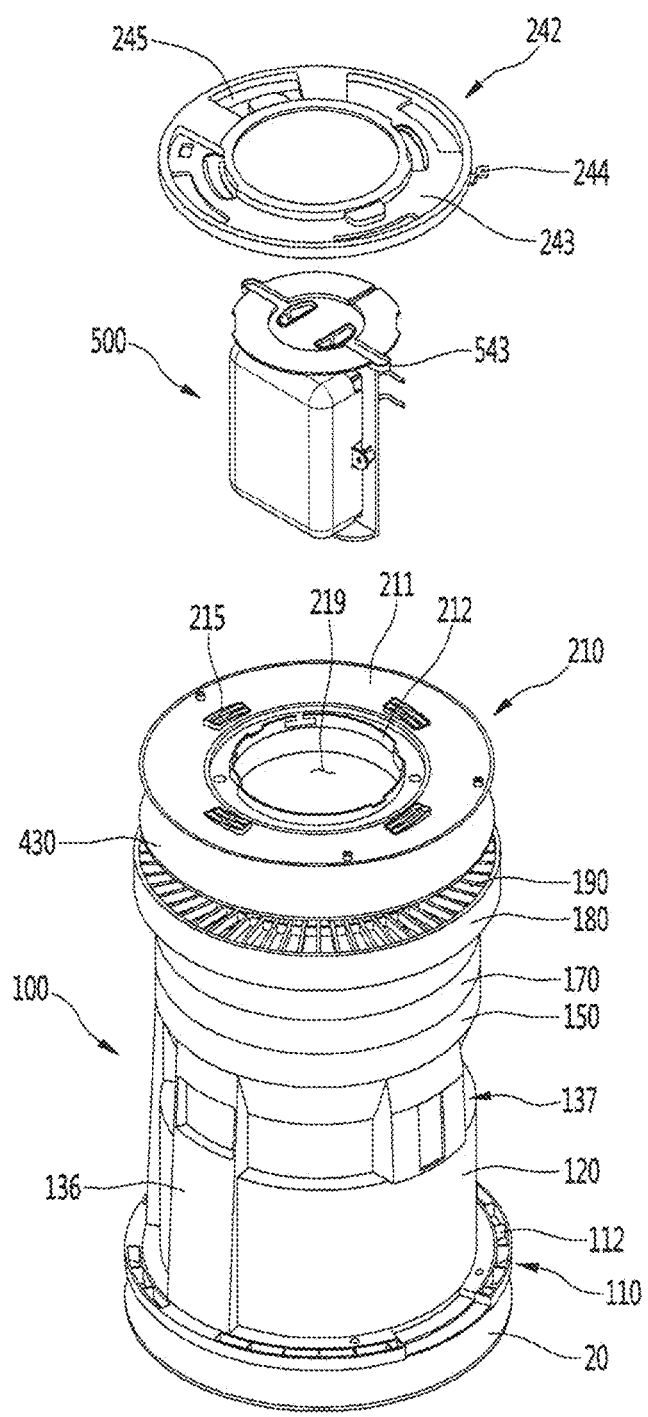
FIG. 11 is a partial perspective view of the air cleaner and the PCB device according to an embodiment.
Figure 12:
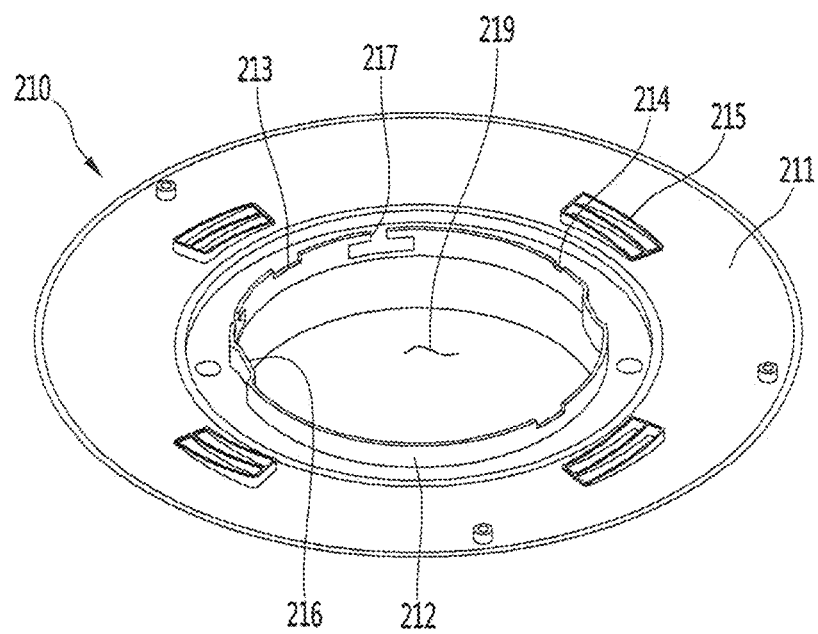
FIG. 12 is a view of a lever supporting device of the air cleaner of FIG. 1.

FIG. 10 is a view illustrating a state in which a PCB device is installed in an inner space of the air cleaner of FIG. 1. FIG. 11 is a partial perspective view of the air cleaner and the PCB device according to an embodiment. FIG. 12 is a view of a lever supporting device of the air cleaner of FIG. 1.

Referring to FIGS. 10 to 12, the second blowing device 200 according to this embodiment may include a second filter frame 230 that forms a mounting space for the second filter 220. The second filter frame 230 may include a first frame 231 that forms a lower portion of the second filter 230, and a second frame 232 that forms an upper portion of the filter frame 230.

The second filter frame 230 may further include a second filter supporting portion or support 235 that extends in the upward direction toward the second frame 232 from the first frame 231. The first and second frames 231 and 232 may be spaced apart from each other by the second filter supporting portion 235. A mounting space of the first filter 120 may be defined by the first and second frames 231 and 232 and a plurality of filter supporting portions 235.

A sensor device or sensor 237 may be installed at or on the second filter frame 230. The sensor device 237 may include a dust sensor that senses an amount of dust in the air and a gas sensor that senses an amount of gas in the air. The dust sensor and the gas sensor may be disposed or provided to be supported by the second frame 232 of the first filter frame 230. A second supporting portion cover 236 may be coupled to the outside of the second filter supporting portion 235.

The PCB device 500 according to this embodiment may be installed or provided in a center space inside of the air cleaner 10. The PCB device 500 may be inserted into the first to fifth space portions 449, 459, 184, 194, and 219. An upper surface of the PCB device 500 may be located at a substantially same height as an upper surface of the lever supporting device 210. As the PCB device is located in the inner space of the lever supporting device 210, the first and second plates 440 and 450 of the dividing plate 430, the first discharge guide 190, and the second air guide 180, which may be aligned in the vertical direction, it is unnecessary to provide a separate space for installing the PCB device 500, and thus, spatial utilization of the air cleaner may be improved. According to the configuration of the first to fifth space portions 449, 459, 184, 194, and 219, the lever supporting device 210, the first and second plates 440 and 450 of the dividing plate 430, the first discharge guide 190, and the second air guide 180 may have an annular shape.

The PCB device 500 may be supported by the lever supporting device 210 and extend in the downward direction. In addition, a lever device or lever 242 may be provided on or at an upper side of the PCB device 500. The lever device 242 may cover at least a portion of the PCB device 500, that is, a first assembling guide 543 (see FIG. 13). That is, the first assembling guide 543 may be placed in a first groove 213 of the lever supporting device 210, and the lever device 242 may be located on or at an upper side of the first assembling guide 543.

The lever device 242 may include a lever main body 243, which may have a substantially ring shape and be rotatably provided. In addition, a plurality of cut-out portions or cutouts 245, which may be disposed or provided at positions corresponding to a plurality of the movement guides 215 may be formed in the lever main body 243. The plurality of cut-out portions 245 may be through holes formed in the lever main body 243.

The plurality of cut-out portions 245 may be spaced apart from one another in the circumferential direction of the lever main body 243. Each of the plurality of cut-out portions 245 may be rounded with a predetermined curvature in the circumferential direction, corresponding to a curvature of an outer circumferential surface of the lever main body 243. In addition, a second handle 244 may be provided on an outer circumferential surface of the lever main body 243.

The lever supporting device 210 may include a lever supporting main body 211 that forms the fifth space portion 219 and has a substantially annular shape. The lever supporting device 210 may further include a movement guide 215 that protrudes in the upward direction from the lever supporting main body 211.

The lever supporting device 210 may further include a supporting projection 212 that protrudes in the upward direction from an inner circumferential surface of the lever supporting main body 211. The supporting projection 212 may have a substantially annular shape, and support the lever device 242 (see FIG. 11) of the second blowing device 200.

The first groove 213 may be formed in the supporting projection 212. The first groove 213 may be depressed in the downward direction from an upper end of the supporting projection 212. The first groove 213 may support the first assembling guide 543 of the PCB device 500. The first groove 213 may be referred to as a "first supporting groove." A plurality of first grooves 213 may be formed corresponding to a number of first assembling guides 543.

A second groove 214 may be formed in the supporting projection 212. The second groove 214 may be depressed in the direction from the upper end of the supporting projection 212. The second groove 214 may support a second assembling guide 544 of the PCB device 500. The second groove 214 may be referred to as a "second supporting groove."

A third groove 217 may be formed in the supporting projection 212. The third groove 217 may be depressed in the downward direction from the upper side of the supporting projection 212. The third groove 217 may be configured such that its sectional shape is a "⊥" shape. The third groove 217 may be configured such that an electrical line that extends to the PCB device 500 or an electrical line that extends from the PCB device 500 passes therethrough. The third groove 217 may be referred to as a "third supporting groove." A plurality of third grooves 217 may be formed.

The supporting projection 212 may include a first depression portion or depression 216 that supports the PCB device 500. The first depression portion 216 may be configured such that an outer circumferential surface of the supporting projection 212 is depressed to the inside in the radial direction. The first depression portion 216 may be engaged with a second depression portion or depression 546 of the PCB device 500. The first depression portion 216 may be located or provided at an outside of the second depression portion 546 to support the PCB device 500, and may prevent movement of the PCB device. A plurality of first depression portions 216 may be formed corresponding to a number of second depression portions 546.

Figure 13:
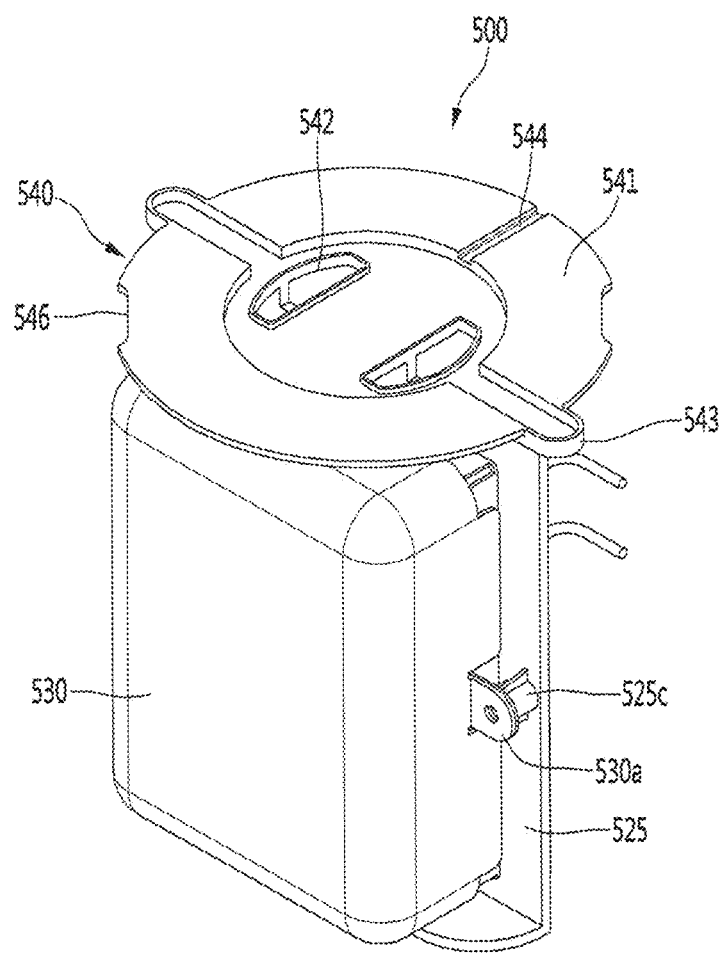
FIG. 13 is a perspective view of the PCB device according to an embodiment.
Figure 14:
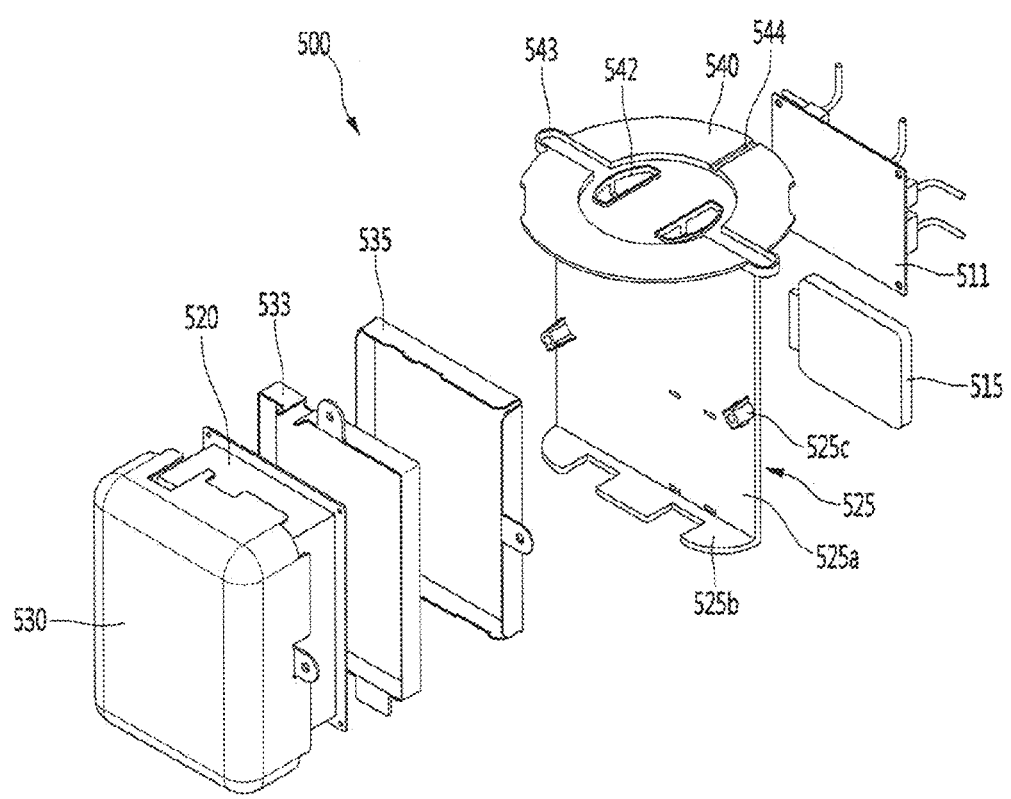
FIGS. 14 and 15 are exploded perspective views of the PCB device according to an embodiment.
Figure 15:
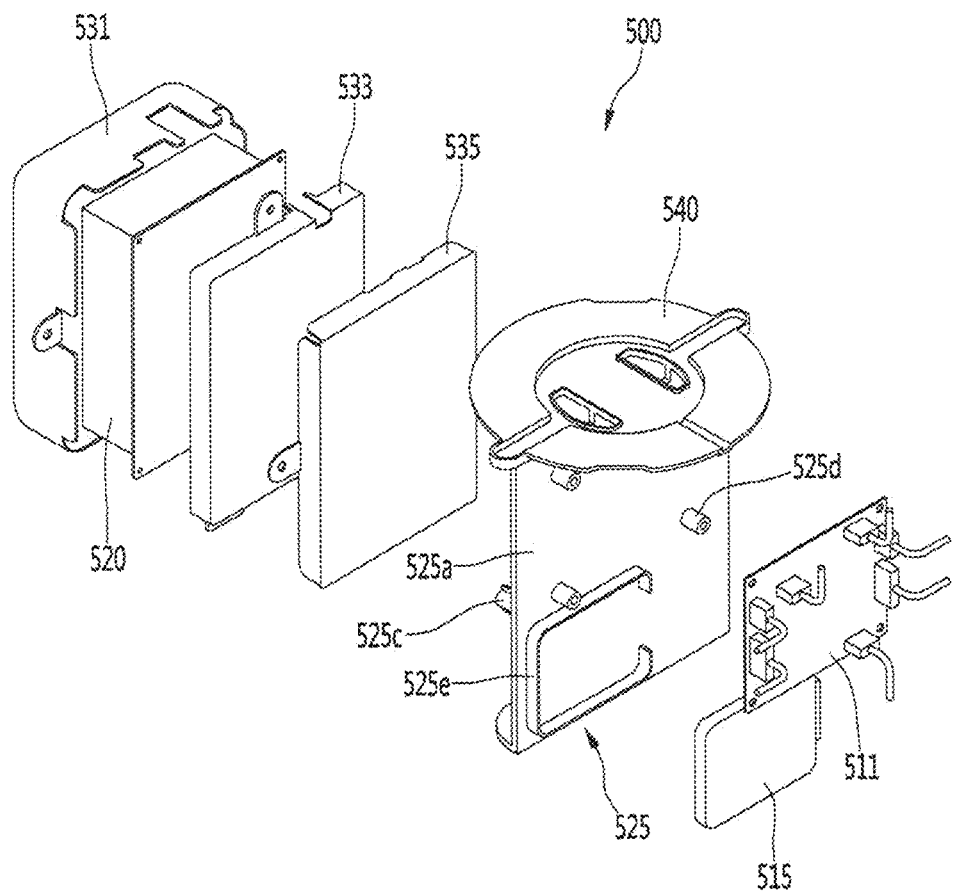

FIG. 13 is a perspective view of the PCB device according to an embodiment. FIGS. 14 and 15 are exploded perspective views of the PCB device according to an embodiment.

Referring to FIGS. 13 to 15, the PCB device 500 according to this embodiment may include a main PCB 511 and a power supply portion or supply 520. The PCB device 500 may further include a case assembly 530 which may surround the power supply portion 520.

The power supply portion 520 may be connected to a power cord of the air cleaner 10 by an electrical line (harness). In addition, the power supply portion 520 and the main PCB 511 may be connected to each other by another electrical line.

The power supply portion 520 may include a PCB (power PCB) for AC power, and the main PCB 511 may include a PCB for DC power. The PCB for AC power may be referred to as a "first PCB," and the PCB for DC power may be referred to as a "second PCB."

The PCB device 500 may further includes a PCB supporting portion or support 525 at or to which the main PCB 511 and the power supply portion 520 may be installed or provided. The main PCB 511 may be installed or provided on one or a first surface of the PCB supporting portion 525, and the power supply portion 520 may be installed or provided on the other or a second surface of the PCB supporting portion 525. The one surface and the other surface of the PCB supporting portion 525 may be surfaces opposite to each other. For example, the one surface may be a right side surface, and the other surface may be a left side surface.

Thus, the main PCB 511 and the power supply portion 520 may be aligned in the radial direction or in the lateral direction relative to the PCB supporting portion 525. By this alignment, a vertical length of the PCB device 500 is not long, and the entire device may be compact.

The PCB device 500 may further include a communication module 515. For example, the communication module 515 may include a Wi-Fi module. The communication module 515 may be supported on one surface of the PCB supporting portion 525, and may be disposed or provided on a lower side of the main PCB 511.

The power supply portion 520 may be disposed or provided at a left or first side relative to the PCB supporting portion 525, and the main PCB 511 and the communication module 515 may be disposed at the right or a second side relative to the PCB supporting portion 525. Components of the PCB device 500 may be disposed or provided symmetrically to the left and right relative to the PCB supporting portion 525, so that the PCB device 500 may be stably supported in the air cleaner 10.

The PCB supporting portion 525 may include a first supporting portion or support 525a that extends in the vertical direction and provides a coupling surface of the main PCB 511 and the power supply portion 520, and a second supporting portion or support 525*b* that extends in the radial direction from a lower side of the first supporting portion 525*a* to support the power supply portion 520 and the case assembly 530.

A total weight of the power supply portion 520 and the case assembly 530 may be relatively large, and thus, the power supply portion 520 and the case assembly 530 may be stably supported by the second supporting portion 525*b*. The PCB supporting portion 525 may further include a case coupling portion 525*c*. A plate coupling portion 530*a* of the case assembly 530 may be coupled to the case coupling portion 525*c*. In addition, the case coupling portion 525*c* may protrude from the surface on which the power supply portion 520 and the case assembly 530 are installed or provided.

The PCB supporting portion 525 may further include a PCB coupling portion 525*d*. The main PCB 511 may be coupled to the PCB coupling portion 525*d*. In addition, the PCB coupling portion 525*d* may protrude from the surface on which the main PCB 511 is installed or provided, and a plurality of PCB coupling portions 525*d* may be provided.

The PCB supporting portion 525 may also include a module supporting portion or support 525*e*. The communication module 515 may be supported by the module supporting portion 525*e*. The module supporting portion 525*e* may protrude from a surface on which the communication module 515 is installed or provided, and may be bent to surround an outer surface of the communication module 515.

The PCB device 500 may include a supporting plate 540 that supports the PCB device 500 in the air cleaner 10. The supporting plate 540 may be provided on or at an upper side of the PCB supporting portion 525.

The supporting plate 540 may include a plate main body 541, which may have a substantially disk shape, and a grasping portion or grasp 542, which may be disposed or provided at a substantially center portion of the plate main body 541 to be grasped by a user. Two grasping portions 542 may be formed to be spaced apart from each other.

The supporting plate 540 may include a first assembling guide 543 that protrudes to a lower side of the plate main body 541 to be placed in the first groove 213 of the lever supporting device 210. A plurality of first assembling guides 543 may be provided, and may be provided at both sides of the supporting plate 540. In addition, the first assembling guide 543 may protrude in an outer direction from the outer circumferential surface of the plate main body 541. The supporting plate 540 may include a second assembling guide 544 that protrudes to the lower side of the plate main body 541 to be placed in the second groove 214 of the lever supporting device 210.

According to the configuration of the first and second assembling guides 543 and 544, a worker may easily assemble the PCB device 500 to the lever supporting device 210, and mis-assembling may be prevented. In addition, it is possible to prevent the PCB device 500 from being relatively moved to the lever supporting device 210 by the first and second assembling guides 543 and 544 in a state in which the PCB device 500 is completely assembled.

The supporting plate 540 may include a second depression portion or depression 546 which may be depressed by a predetermined depth to the inside in radial direction from an outer circumferential surface of the plate main body 541. The second depression portion 546 may be engaged with the first depression portion 216 of the lever supporting device 210. In a state in which the PCB device 500 is assembled to the lever supporting device 210, the first and second depression portions 216 and 546 may interfere with each other, so that it is possible to prevent a phenomenon that the PCB device 500 is moved, particularly, a phenomenon that the PCB device 500 is undesirably rotated.

The PCB device 500 may include a case assembly 530 that protects the power supply portion 520. The case assembly 530 may include a first case 531 that covers one or a first side portion or side of the power supply portion 520 and a second case 535 that covers the other or a second side portion or side of the power supply portion 520. The first and second cases 531 and 535 may be coupled to each other to cover the power supply portion 520.

The first case 531 and the second case 535 may be made of a nonflammable material so as to protect the power supply portion 520 and to prevent a fire from occurring in other components provided in the air cleaner 10 due to heat generated from the power supply portion 520. For example, the first case 531 or the second case 535 may be made of a steel material.

The case assembly 530 may include an insulating member or insulator 533, which may be installed or provided between the power supply portion 520 and the second case 535. The insulating member 533 may protect the power supply portion 520, and may perform a function, that is, an insulating function of preventing current leak in the power supply portion 520 from being transferred to other components. For example, the insulating member 533 may be made of acrylonitrile-butadiene styrene copolymer (ABS) resin.

A process of assembling the PCB device 500 will be described hereinafter.

When a process of connecting an electrical line to the PCB device (line connecting process) is performed, the PCB device 500 may be overturned in the vertical direction such that the supporting plate 540 faces in the downward direction and the PCB supporting portion 525 faces in the upward direction. In addition, the PCB device 500 may be supported on the lever supporting device 210. At this time, the first assembling guide 543 may be mounted in the first groove 213.

If the line connecting process is completed, the PCB device 500 may again be overturned to be moved in the downward direction. In the process in which the PCB device 500 is moved in the downward direction, the PCB device 500 may be located in the first to fifth space portions 449, 459, 184, 194, and 219. In addition, movement of the PCB device 500 in the downward direction may be performed until the first and second assembly guides 543 and 544 are mounted in the first and second grooves 213 and 214.

If the assembling of the PCB device 500 is completed, the lever device 242 may be coupled to an upper side of the PCB device 500. The lever main body 243 of the lever device 242 may cover an upper side of the first assembling guide 543.

When the PCB device is disassembled so as to perform an after-sales service, the PCB device 500 may be separated by moving the lever device 242 in the upward direction and then lifted. According to this configuration, it is possible to improve operation convenience for assembling and disassembling of the PCB device 500.

A configuration of the second blowing device 200 will be described with reference to FIGS. 2 and 3.

The second blowing device 200 may include a lever device and a supporting device, which may be provided on or at an upper side of the lever supporting device 210. The lever device and the supporting device may be the same or similar to the lever device 142 and the supporting device 140 of the first blowing device 100, and therefore, repetitive description has been omitted.

The second blowing device 200 may include a third air guide device or guide 270, which may be coupled to an upper side of the second fan 260 to guide flow of air passing through the second fan 260. The third air guide 270 may be the same or similar to the first air guide 170, and therefore, repetitive description has been omitted.

The third air guide 270 may include a guide device or guide that guides movement of the flow adjusting device 300. The guide may include a first rack and a shaft guide groove.

The second blowing device 200 may include a second discharge guide device or guide 280, which may be disposed or provided at or on an upper side of the third air guide 270 and guide the flow of air passing through the third air guide 270. The flow adjusting device 300 may be movably provided on or at an upper side of the second discharge guide 280. The flow adjusting device 300 may include a third fan 330. The third fan 330 may guide air passing through the third air guide 270 to be discharged outside of the air cleaner 10. A third fan motor 335 may be coupled to the third fan 330.

The third fan 330 may include an axial flow fan. The third fan 330 may be operated to allow air introduced in the axial direction by passing through the third air guide 270 to be discharged in the axial direction. The air passing through the third fan 330 may be discharged to the outside through the second discharge portion 305, which may be located at or on an upper side of the third fan 330.

In the air cleaner 10, a discharged blowing amount may be improved, and air may be discharged in various directions as the second discharge portion 305 along with the first discharge portion 105 of the first blowing device 100 may be provided.

A display device 600, which may display operation information of the air cleaner 10, may be provided on or at an upper surface of the air cleaner 10. The display device 600 may include a display PCB 618. The display PCB 618 may be installed or provided in a space between an upper surface of the air cleaner 10 and the third fan 330.

The first fan motor 165 and the second fan motor 265 may be disposed or provided in series relative to a longitudinal direction of the air cleaner 10. In addition, the second fan motor 265 and the third fan motor 335 may be disposed or provided in series relative to the longitudinal direction of the air cleaner 10.

The flow adjusting device 300 may further include a rotation guide device or guide, that guides rotation in the lateral direction of the flow adjusting device 300 and rotation in the vertical direction of the flow adjusting device 300. The rotation in the lateral direction may be referred to as a "first direction rotation" and the rotation in the vertical direction may be referred to as a "second direction rotation."

The rotation guide may include a first guide mechanism or guide that guides the first direction rotation of the flow adjusting device 300 and a second guide mechanism or guide that guides the second direction rotation of the flow adjusting device 300. The first guide may include a first gear motor 363 that generates a drive force, and a first gear 360 rotatably coupled to the first gear motor 363. For example, the first gear motor 363 may include a step motor, a rotation angle of which may be easily controlled.

The second guide may include a rotation guide member or guide 370 (see FIG. 16) that guides the second direction rotation of the flow adjusting device 300. The rotation guide 370 may include a rack 374.

The second guide may include a second gear motor 367 that generates a drive force, and a second gear 365 coupled to the second gear motor 367. For example, the second gear motor 367 may include a step motor. If the second gear motor 367 is driven, the rotation guide 370 may rotate in the vertical direction by linkage of the second gear 365 and the second rack 374. Accordingly, the flow adjusting device 300 may perform the second direction rotation according to the movement of the rotation guide 370.

Figure 16:
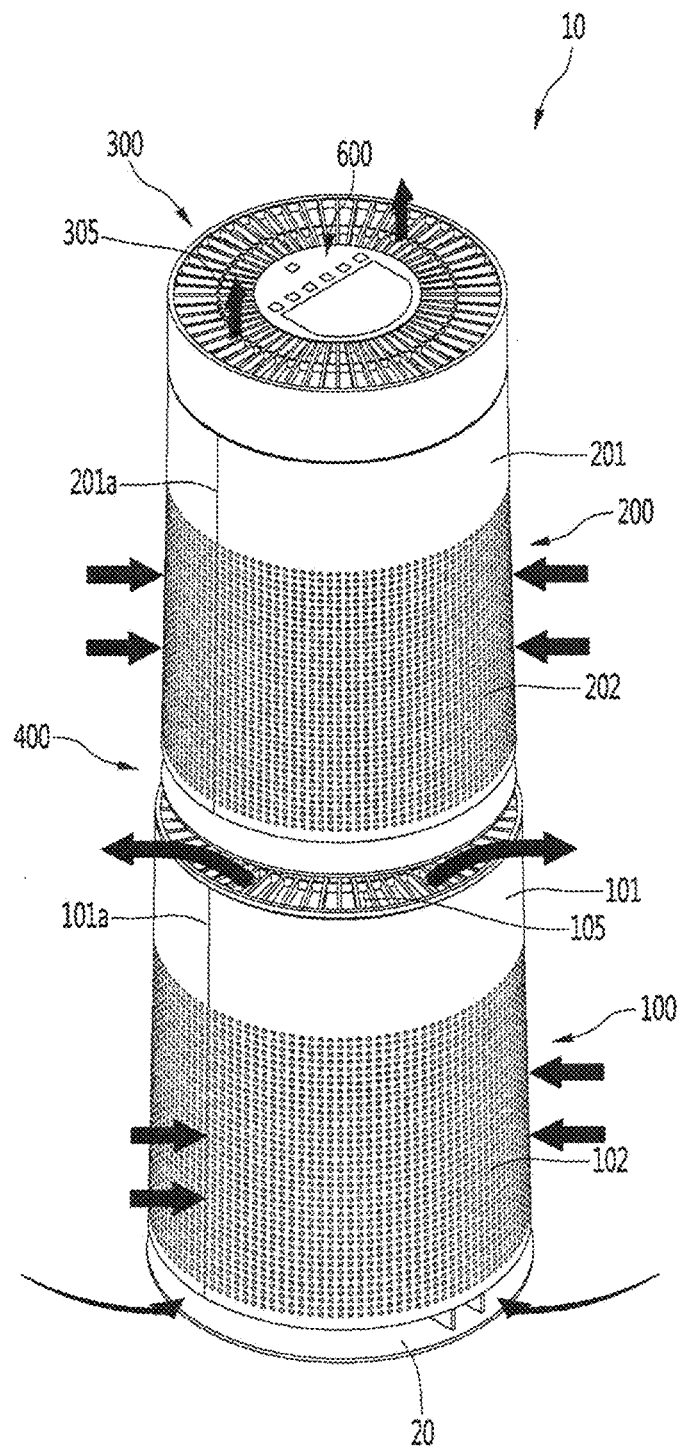
FIGS. 16 to 18 are views illustrating a state in which air flows in the air cleaner of FIG. 1.

If the flow adjusting device 300 performs the second direction rotation, the flow adjusting device 300 may be in a "second position" in which it protrude from the upper surface of the air cleaner 10 (see FIG. 16). On the other hand, as shown in FIG. 3, the position in which the flow adjusting device 300 is laid out may be referred to as a "first position."

Figure 17:
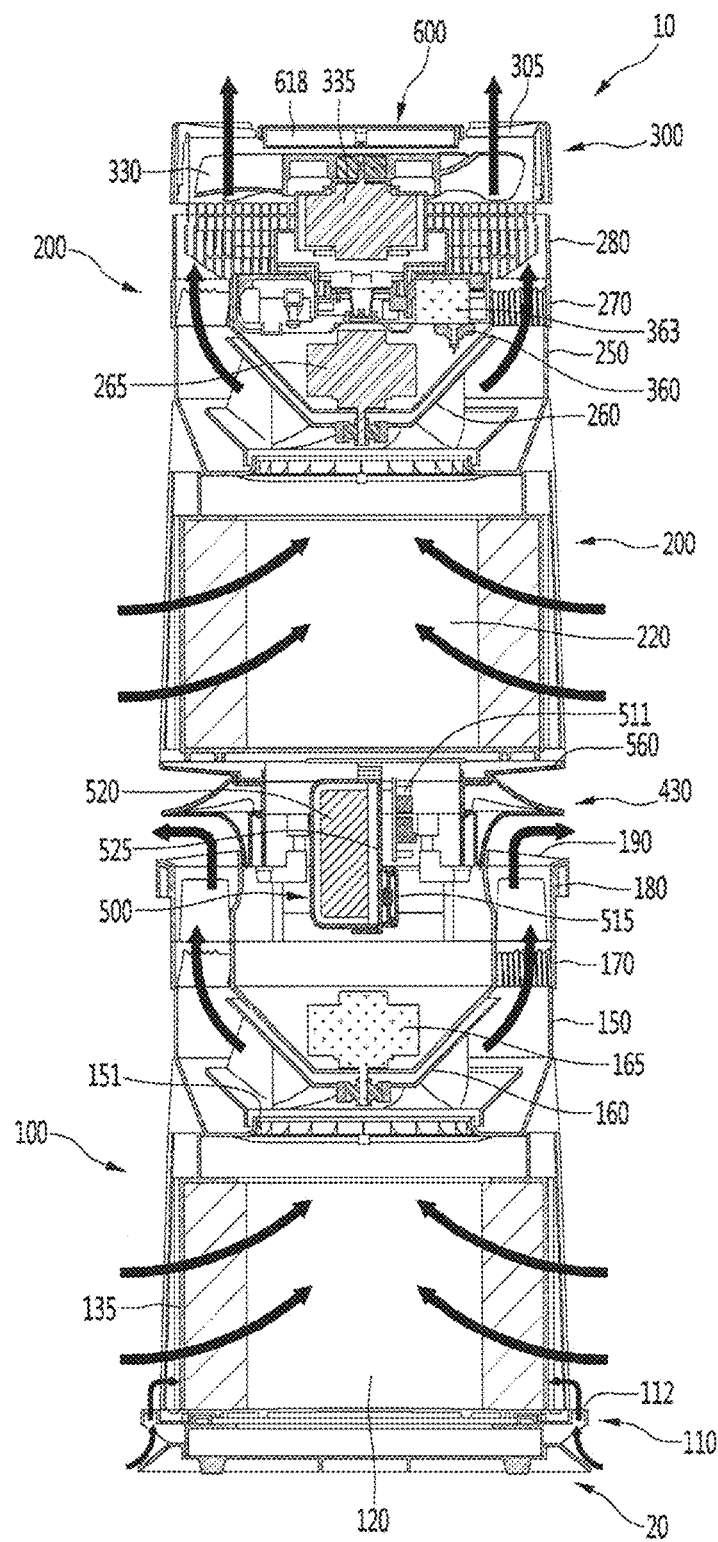

FIGS. 16 to 18 are views illustrating a state in which air flows in the air cleaner of FIG. 1.

First, a flow of air according to operation of the first blowing device 100 is described hereinafter. When the first fan 160 is driven, indoor air is suctioned into the inside of the first case 101 through the first suction portion 102 and the base suction portion 103. The suctioned air passes through the first filter 120 and foreign materials in the air may be filtered in this process. In the process of the air passing through the first filter 120, air may be suctioned in a radial direction of the first filter 120, filtered, and then flow in the upward direction.

The air which has passed through the first filter member 120 may flow to the upper side in the radial direction while passing through the first fan 160 and stably flow in the upward direction while passing through the first air guide 170 and the second air guide 180. Air passing through the first air guide 170 and the second air guide 180 may pass by the first discharge guide 190 and flow in the upward direction through the first discharge portion 105. Air which is discharged through the first discharge portion 105 may be guided by the dividing plate 430, which may be positioned at an upper side of the first discharge guide 190, and thus, may be discharged outside of the air cleaner 10. Air which is discharged through the first discharge portion 105 may be guided by the dividing plate 430, which may be located on or at the upper side of the first discharge guide 190, to be discharged to the outside of the air cleaner 10.

As an outermost portion in the radial direction of the dividing plate 430 is located outward of the outermost portion of the flow path of air discharged through the first discharge portion 105, it is possible to prevent the air discharged from the first discharge portion 105 from flowing in the upward direction, and air discharged in the radial direction may be effectively guided.

When the second fan 260 is driven, indoor air may be suctioned into the inside of the second case 201 through the second suction portion 202, The suctioned air may pass through the second filter 220, and in this process, foreign materials in the air may be filtered, in the process of the air passing through the second filter 220, air may be suctioned in the radial direction of the first filter 120, filtered, and then flow in the upward direction.

Air having passed through the second filter 220 may flow to the upper side in the radial direction while passing through the second fan 160, and stably flow in the upward direction while passing through the third air guide 270 and the second discharge guide 280. Air having passed through the third air guide 270 and the second discharge guide 280 may be discharged through the second discharge portion 305 via the flow adjusting device 300.

If the flow adjusting device 300 is in the first position in which the flow adjusting 300 is laid out, as shown in FIGS. 16 and 17, air which is discharged from the flow adjusting device 300 may flow in the upward direction. On the other hand, if the flow adjusting device 300 is in the second position in which the flowing adjusting device 300 is inclined, as shown in FIG. 18, air which is discharged from the flow adjusting device 300 may flow toward the front upper side. By the flow adjusting device 300, an amount of air which is discharged from the air cleaner 10 may be increased, and purified air may be supplied up to a position a far distant from the air cleaner 10.

Embodiments disclosed herein provide an air cleaner capable improving a suction capacity of air suctioned into the air cleaner. Embodiments disclosed herein further provide an air cleaner capable of sufficiently suctioning air around a person in a room whether the person in the room is sitting down or standing up by including a suction flow path directed from a circumferential direction of the air cleaner to an inside portion thereof and a suction flow path through which air is introduced through an upper portion and a lower portion of the air cleaner.

Embodiments disclosed herein also provide an air cleaner capable of discharging air which is discharged from the air cleaner in various directions and sending the discharged air a long distance. In particular, embodiments disclosed herein provide an air cleaner capable of easily discharging air toward a surrounding space to a person in a room whether the person in the room is sitting down or standing up by a discharge air flow being easily generated in an upward direction, a frontward direction, and lateral directions of the air cleaner.

Embodiments disclosed herein provide an air cleaner which enables air discharged from the air cleaner to be easily guided outside of the air cleaner and may prevent the discharged air from being again re-introduced to the air cleaner. In particular, embodiments disclosed herein provide an air cleaner which may prevent air discharged from a first blowing device from being re-introduced to a second blowing device.

Embodiments disclosed herein provide an air cleaner which proposes an installation position of a PCB device provided to control an operation of the air cleaner and improves spatial utilization of the air cleaner. Embodiments disclosed herein provide an air cleaner a blowing capacity of which may be increased.

Embodiments disclosed herein provide an air cleaner in which an air guide device or guide may be provided which allows air passing through a centrifugal fan to easily flow toward a discharge portion in an upward direction in a case of adopting the centrifugal fan in order to increase a blowing capacity. Embodiments disclosed herein provide an air cleaner which improves purification capacity of a filter and in which replacement of the filter may be easily performed. Embodiments provide an air cleaner in which a filter may be easily installed without an installation space for installing the filter in an inside portion of the air cleaner being additionally provided.

Embodiments disclosed herein provide an air cleaner that may include a first air cleaning module including a first fan which generates air flow toward a first discharge portion or outlet from a first suction portion or inlet; a second air cleaning module including a second fan which generates air flow toward a second discharge portion or outlet from a second suction portion or inlet; a dividing device or divider disposed or provided between the first air cleaning module and the second air cleaning module, the dividing device having a dividing plate space portion or space; and a PCB device installed or provided in the dividing plate space portion. The dividing plate space portion may include a through hole that passes through upper and lower portions of the dividing plate.

The dividing plate may include a first plate having a first space portion or space, and a second plate coupled to an upper side of the first plate, the second plate having a second space portion. The first and second space portions may be aligned in the upward direction to form the dividing plate space portion.

The air cleaner may further include a second air guide device or guide disposed or provided at a discharge side of the first fan to guide air flow to the first discharge portion. The second air guide device may include a third space portion or space in which at least a portion of the PCB device may be located. The third space portion may be formed as a center portion of the second air guide device passes therethrough in a vertical direction.

The air cleaner may further include a first discharge guide device or guide disposed or provided at a discharge side of the second air guide device, the first discharge guide device having the first discharge portion. The first discharge guide device may include a fourth space portion or space in which at least a portion of the PCB device may be located. The third and fourth space portions may be aligned in the vertical direction.

The air cleaner may further include a lever supporting device or support coupled to one side of the dividing plate, the lever supporting device having a fifth space portion or space which communicates with the dividing plate space portion. The lever supporting device may include a movement guide portion or guide which supports a filter member or filter of the second air cleaning module and guides movement of the filter member in the vertical direction. The dividing plate may allow the first air cleaning module and the second air cleaning module to be spaced apart from each other in the vertical direction.

The PCB device may include a PCB supporting portion or support extending in the vertical direction, and first and second PCBs provided at both sides of the PCB supporting portion, the first and second PCBs being arranged in a radial direction. The PCB device may further include a supporting plate provided on an upper side of the PCB supporting portion, the supporting plate being supported on at least a portion of the second air cleaning module.

The second air cleaning module may include a filter member or filter, and a lever supporting device or support which supports a lower side of the filter member. The supporting plate may be supported by the lever supporting device. The supporting plate may include an assembling guide which may be placed in a groove of the lever supporting device.

The lever supporting device may include a lever supporting main body having an annular shape, and a supporting projection protruding from the lever support main body. The supporting plate may include a grasping portion or grasp, which is capable of being grasped by a user.

The PCB device may include a power supply portion or power supply; a case made of a nonflammable material, the case surrounding the power supply portion; and an insulating member or insulator disposed or provided between the power supply portion and the case. The PCB device may include a PCB supporting portion or support having a first surface on which the power supply portion may be installed or provided, and a main PCB installed or provided on a second surface of the PCB supporting portion.

According to embodiments, a suction capacity may be improved as the suction portion may be formed along an outer circumferential surface of a cylindrical case and a structural resistance of the case may not be generated in an air suction process. In particular, a plurality of apertures may be included on the suction portion and a suction flow path which may be directed to the inside portion of the air cleaner may be formed in 360 degree directions relative to the air cleaner, as the plurality of apertures may be formed evenly over an entire outer circumferential surface of the case. A suction area of air may be increased and air around a person in a room may be sufficiently suctioned where the person in the room is sitting down or standing up.

The suction portion may include a first suction portion or inlet, which may be provided in the first case, a third suction portion or inlet, which may be provided in the second case, and a second suction portion or inlet, which may be provided in a base side, and thus, may be formed in an axial direction from a lower portion to an upper portion of the case. Accordingly, a suction capacity of the indoor space may be increased, as air which exists in a lower portion of the indoor space and air of the indoor space which exists in a relatively high position relative to the air cleaner may be suctioned to the air cleaner.

In addition, discharge of air in the upward direction may be guided through the second blowing device and discharge of air in the frontward direction may be guided by the flow adjusting device, which may be provided on or at an upper side of the second blowing device. Discharge of air in a lateral direction may be guided, in a process of rotating the flow adjusting device. Finally, an air cleaning function of the indoor space may be improved as discharge of air in various directions may be guided relative to the air cleaner and a discharge air flow may be formed to extend a long distance from the air cleaner. A discharge air flow may be easily generated toward a circumferential space of the person in the room whether the person in the room is sitting down or standing up.

In addition, the second blowing device may be disposed or provided on or at an upper side of the first blowing device, a dividing plate may be provided between the first and second blowing devices, and air which may be discharged from the first blowing device may be guided to the outside in the radial direction by the dividing plate. Accordingly, it is possible to prevent a phenomenon that air which is discharged from the first blowing device is re-introduced to the second blowing device.

In addition, the PCB device may be provided at a center portion in the air cleaner, and it is unnecessary to provide a separate space to install the PCB device, so that it is possible to improve spatial utilization of the air cleaner. In particular, the PCB device may be located in an inside space portion or space of the second air guide device, the first discharge guide device, the dividing plate, and the lever supporting device, thereby improving spatial utilization of the air cleaner.

As the PCB device may be installed or provided in a divider space portion or space of the first and second blowing device, the PCB device may be installed in the first blowing device, and the filter member of the second blowing device may then be assembled in an assembling process of the air cleaner, thereby performing a simple assembling process of the air cleaner.

In addition, in the PCB device, the power supply portion and the main PCB may be installed or provided at both sides of the PCB supporting plate, and components of the PCB device may be arranged in a lateral direction or in the radial direction. Accordingly, a vertical length of the PCB device may be decreased, and a total volume of the PCB device may be reduced.

As a plurality of cases made of a nonflammable material may be provided for the power supply portion which generates a relatively high heat in the PCB device, it is possible to prevent heat generated from the power PCB of the power supply portion from being transferred to other components in the air cleaner. Accordingly, it is possible to prevent a fire from occurring in the air cleaner. In addition, the insulating member may be provided at one side of the power supply portion, to protect the power supply portion and to perform a function of preventing current leaked in the power supply portion from being transferred to other components.

As the PCB device may include a communication module, an application may be downloaded from an external device. Information for an operation of the air cleaner may be utilized by executing the application.

The assembling guide may be provided in the PCB device, so that the PCB device may be stably fixed in the air cleaner. A display device that displays air cleanliness may be disposed or provided between the first and second plates, so that intuitive recognition by a user may be easily made.

A blowing capacity of the air cleaner may be improved as a plurality of blowing devices may be provided. The air which flows in the radial direction through the centrifugal fan may be easily guided toward the discharge portion in the upward direction, as the centrifugal fan for increasing the blowing capacity of the air cleaner and the air guide which is disposed on or at an outlet side of the centrifugal fan may be provided.

In addition, interference between air flows may be prevented as the air flows which are independent from each other may be generated by the first blowing device and the second blowing device. Accordingly, an air flowing capacity may be improved. The suction area may be increased as air may be introduced to an inside portion of the filter from all radial directions of the filter by the filter being provided in a cylindrical shape. Accordingly, an air cleaning capacity of the filter may be improved.

Assembly or disassembly of the filter member may be easily performed as the filter may be slid toward the filter frame in the radial direction.

A blowing amount may be increased as a turbo fan which suctions air in an axial direction and then discharges air in a radial direction may be included in the blowing fan. Flow loss and noise may be reduced, as the air guide in which the guide rib may be included may be provided in or at an outlet side of the turbo fan. Vortex generation may be reduced and air flow toward the discharge portion may be smoothly performed, as the projecting portion may be provided in the guide rib.

A flow adjusting device that changes a direction of air flow may be provided on or at one side of the blowing device, so that air may be discharged toward the front. Accordingly, air discharged from the air cleaner may be discharged a long distance.

The scope should not be limited to the aforementioned embodiments but defined by appended claims. The technical spirit within the scope substantially identical with the scope will be considered to fall in the scope defined by the appended claims.

Although exemplary embodiments are described for illustrative purposes, it will be apparent to those skilled in the art that various modifications and changes may be made thereto within the scope without departing from the essential features of the disclosure. Accordingly, the aforementioned embodiments should be construed not to limit the technical spirit but to be provided for illustrative purposes so that those skilled in the art can fully understand the spirit.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner comprising:
    a first air cleaning module including a first, fan that generates an air flow toward a first discharge outlet from a first suction inlet;
    a second air cleaning module including a second fan that generates an air flow toward a second discharge outlet from a second suction inlet;
    a divider provided between the first air cleaning module and the second air cleaning module, the divider guiding air discharge from the first discharge outlet outside of the air cleaner such that the discharged air is not introduced into the second suction inlet of the second air cleaning module and including a dividing plate space; and
    a printed circuit board (PCB) device provided in the dividing plate space.

2. The air cleaner according to claim 1, wherein the dividing plate space includes a through hole through which upper and lower portions of the dividing plate extend.

3. The air cleaner according to claim 1, wherein the dividing plate includes:
    a first plate having a first space; and
    a second plate coupled to an upper side of the first plate, the second plate having a second space.

4. The air cleaner according to claim 3, wherein the first and second spaces are arranged to extend in an upward direction to form the dividing plate space.

5. The air cleaner according to claim 1, further including a first air guide provided at a discharge side of the first fan to guide air flow to the first discharge outlet, wherein the first air guide includes a third space in which at least a portion of the PCB device is located.

6. The air cleaner according to claim 5, wherein the third space is formed at a center portion of the first air guide and passes therethrough in a vertical direction.

7. The air cleaner according to claim 5, farther including a first discharge guide provided at a discharge side of the first air guide, the first discharge guide having the first discharge outlet, wherein the first discharge guide includes a fourth space in which at least a portion of the PCB device is located.

8. The air cleaner according to claim 7, wherein the third and fourth space portions are aligned in the vertical direction.

9. The air cleaner according to claim 7, further including a lever support coupled to one side of the dividing plate, the lever supporting device having a fifth space that communicates with the dividing plate space.

10. The air cleaner according to claim 9, wherein the lever support includes a movement guide that supports a filter of the second air cleaning module and guides movement of the filter in a vertical direction.

11. The air cleaner according to claim 1, wherein the dividing plate allows the first air cleaning module and the second air cleaning module to be spaced apart from each other in a vertical direction.

12. The air cleaner according to claim 11, wherein the PCB device includes:
    a PCB support that extends in the vertical direction; and
    first and second PCBs provided at both sides of the PCB support, the first and second PCBs being arranged in a radial direction.

13. The air cleaner according to claim 12, wherein the PCB device further includes a supporting plate provided at an upper side of the PCB support, the supporting plate being supported on at least a portion of the second air cleaning module.

14. The au cleaner according to claim 13, wherein the second air cleaning module includes a filter and a lever support that supports a lower side of the filter, and wherein the supporting plate is supported by the lever support.

15. The air cleaner according to claim 14, wherein the supporting plate includes an assembling guide configured to be placed in a groove of the lever support.

16. The air cleaner according to claim 15, wherein the lever support includes:
    a lever supporting main body having an annular shape; and
    a supporting projection that protrudes from the lever support main body, wherein the groove is recessed downward from, an upper port-on of the supporting projection.

17. The air cleaner according to claim 13, wherein the supporting plate includes a grasping portion configured to be grasped by a user.

18. The air cleaner according to claim 1, wherein the PCB device includes:
    a power supply;
    a case made of a nonflammable material, the case surrounding the power supply; and
    an insulating member provided between the power supply and the case.

19. The air cleaner according to claim 18, wherein the PCB device includes:
    a PCB support having a first surface on which the power supply is provided; and
    a main PCB provided on a second surface of the PCB support.

20. An air cleaner comprising:
a first air cleaning module including a first fan that generates an air flow toward a first discharge outlet from a first suction inlet;
a second air cleaning module including a second fan that generates an air flow toward a second discharge outlet from a second suction inlet;
a divider provided between the first air cleaning module and the second air cleaning module, the divider guiding air discharged from the first discharge outlet outside of the air cleaner such that the discharged air is not introduced into the second suction inlet of the second air cleaning module; and
a printed circuit board (PCB) device provided in an annular space formed by the divider and portions of the first and second air cleaning modules.

* * * * *